(12) United States Patent
Mao

(10) Patent No.: US 11,677,332 B2
(45) Date of Patent: Jun. 13, 2023

(54) INVERTER CURRENT EQUALIZATION METHOD AND APPARATUS, INVERTER SYSTEM, AND WIRELESS CHARGING SYSTEM

(71) Applicant: Huawei Technologies Co., Ltd., Shenzhen (CN)

(72) Inventor: Yunhe Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 501 days.

(21) Appl. No.: 16/856,435

(22) Filed: Apr. 23, 2020

(65) Prior Publication Data

US 2020/0259356 A1  Aug. 13, 2020

Related U.S. Application Data

(63) Continuation of application No. PCT/CN2018/088352, filed on May 25, 2018.

(30) Foreign Application Priority Data

Oct. 24, 2017   (CN) .......................... 201711000947.2

(51) Int. Cl.
H02J 7/02        (2016.01)
H02M 7/5387    (2007.01)
(Continued)

(52) U.S. Cl.
CPC ............. *H02M 7/5387* (2013.01); *H02J 7/02* (2013.01); *H02J 50/10* (2016.02); *H02J 50/20* (2016.02);
(Continued)

(58) Field of Classification Search
CPC .. H02J 3/38; H02J 7/0068; H02J 3/007; H02J 7/35; H02J 9/061; H02J 2300/00;
(Continued)

(56) References Cited

U.S. PATENT DOCUMENTS 5,262,935 A    11/1993 Shirahama et al.
2013/0141952 A1  6/2013 Kaneko
(Continued)

FOREIGN PATENT DOCUMENTS

CN       1581628 A    2/2005
CN     102655379 A    9/2012
(Continued)

OTHER PUBLICATIONS

Lan, X., "Analysis and Realization of DC-AC Inverter Parallel System Based on Active and Reactive Circulating-Durrent Control," Transactions of China Electrotechnical Society, vol. 20 No. 10, Oct. 2005, 6 pages, with partial English translation.
(Continued)

*Primary Examiner* — Binh C Tat
(74) *Attorney, Agent, or Firm* — Conley Rose, P.C.

(57) ABSTRACT

An inverter current equalization method includes separately comparing a reactive current of a first inverter and a reactive current of a second inverter with a reactive current reference value, to obtain a reactive current difference of the first inverter and a reactive current difference of the second inverter, separately comparing an active current of the first inverter and an active current of the second inverter with an active current reference value, to obtain an active current difference of the first inverter and an active current difference of the second inverter, and adjusting an input voltage amplitude of the first inverter and an input voltage amplitude of the second inverter based on the reactive current difference of the first inverter and the reactive current difference of the second inverter.

20 Claims, 21 Drawing Sheets

(51) Int. Cl.
*H02J 50/10* (2016.01)
*H02J 50/20* (2016.01)
*H02M 7/537* (2006.01)
*H02M 3/335* (2006.01)
*H02M 7/493* (2007.01)

(52) U.S. Cl.
CPC ....... *H02M 3/33573* (2021.05); *H02M 7/537* (2013.01); *H02M 7/493* (2013.01)

(58) Field of Classification Search
CPC .......... H02J 2300/22; H02J 3/00; H02J 3/381; H02J 2300/24; H02J 2300/26; H02J 3/46; H02J 50/12; H02J 7/02; H02J 2207/20; H02J 50/40; H02J 7/00712; H02J 2300/10; H02J 2310/48; H02J 7/1492; H02J 7/2434; H02J 3/32; H02J 3/48; H02J 3/50; H02J 2300/28; H02J 3/388; H02J 3/40; H02J 50/60; H02J 50/90; H02J 1/102; H02J 3/001; H02J 3/005; H02J 3/36; H02J 3/383; H02J 50/10; H02J 50/20; H02J 50/30; H02J 7/0016; H02J 7/007; H02J 7/0042; H02J 50/005; H02J 50/80; H02J 7/00034; H02J 50/50; H02J 50/70; H02J 7/0044; H02J 7/0045; H02J 7/342; H02J 2310/22; H02J 50/001; H02J 50/402; H02J 7/00; H02J 7/00032; H02M 7/537; H02M 1/325; H02M 1/44; H02M 3/33546; H02M 3/158; H04B 5/0037; H04B 5/0081; H04B 5/0031; H04B 5/0025; H04B 5/0056; H04L 67/12

USPC .................................................. 320/106–115
See application file for complete search history.

(56) References Cited

U.S. PATENT DOCUMENTS

2017/0093324 A1* 3/2017 Saha .................. H02M 1/36
2017/0373609 A1* 12/2017 Perreault .............. H02M 1/083
2019/0334454 A1* 10/2019 Itoh .................... H02M 7/5395

FOREIGN PATENT DOCUMENTS

| CN | 203708115 U | 7/2014 |
| CN | 105048829 A | 11/2015 |
| CN | 105406513 A | 3/2016 |
| CN | 105449721 A | 3/2016 |
| CN | 105490571 A | 4/2016 |
| CN | 105656338 A | 6/2016 |
| CN | 106849678 A | 6/2017 |
| EP | 2752983 A1 | 7/2014 |

OTHER PUBLICATIONS

Schonknecht, A., "Novel Topology for Parallel Connection of Soft-Switching High-Power High-Frequency Inverters," IEEE Transactions On Industry Applications, vol. 39, No. 2, Mar./Apr. 2003, pp. 550-555.

* cited by examiner

INVERTER CURRENT EQUALIZATION METHOD AND APPARATUS, INVERTER SYSTEM, AND WIRELESS CHARGING SYSTEM

CROSS-REFERENCE TO RELATED APPLICATIONS

This application a continuation of International Patent Application No. PCT/CN2018/088352, filed on May 25, 2018, which claims priority to Chinese Patent Application No. 201711000947.2, filed on Oct. 24, 2017. The disclosures of the aforementioned applications are hereby incorporated by reference in their entireties.

TECHNICAL FIELD

This application relates to the field of electric power and electronic technologies, and in particular to, an inverter current equalization method and apparatus, an inverter system, and a wireless charging system.

BACKGROUND

As energy is exhausted and environmental pollution becomes severer, application of new-energy vehicles, such as electric vehicles, is increasingly popularized. However, a problem of charging an electric vehicle is to be urgently resolved. Currently, wired charging piles are rapidly developed. However, a charging problem is that low-power charging consumes a relatively long time. In this case, charging power needs to be improved such that the electric vehicle can be charged as fast as refueling a fuel vehicle. Therefore, wired charging moves towards charging power of 350 kilowatts (kW) or 500 kW.

However, a problem during the wired charging is that an operator needs to manually insert and remove a charging gun during the wired charging, and a danger of being struck by lightning exists in thunderstorm days.

In addition, after a battery voltage range of the electric vehicle is determined, a higher charging power indicates a coarser and heavier charging cable of the charging gun, or even the charging cable cannot be manually held but a mechanical apparatus is required to assist in an operation. Furthermore, the cable may be easily damaged if the charging gun is frequently inserted and removed, causing high maintenance costs.

To resolve the foregoing problems existing during the wired charging, a wireless charging technology emerges.

There is no electrical connection between a power supply and a load during wireless charging, and no charging gun is required. In addition, charging is automatic, and a charging process is secure and convenient.

However, the wireless charging has a same problem as the wired charging. In an embodiment, the wireless charging also needs to move towards fast charging. In a process of developing a wireless charging system with high power, there is a single-module standalone structure and a multi-module parallel structure.

When a mode in which a plurality of high-frequency modules are connected in parallel is used to supply power, parallel connection between the high-frequency modules may cause unequal output currents between the parallel-connected modules due to reasons such as parameter differences and drive delays of the parallel-connected modules. In other words, output currents of some modules are high, and output currents of some modules are low. As a result, heat of inverters is inconsistent, or even explosion is caused in a severe case.

A conventional technology is to reserve a larger design margin such that a module with severest heat can also meet a temperature rise requirement. However, a design with excessive redundancy causes lower system power density and lower reliability.

SUMMARY

This application provides an inverter current equalization method and apparatus, an inverter system, and a wireless charging system, to implement current equalization of output currents of inverters and implement high reliability.

According to a first aspect, an inverter current equalization method is provided and used to implement current equalization when output ends of a plurality of inverters are in high-frequency parallel connection, where the plurality of inverters include at least two inverters a first inverter and a second inverter, and an output end of the first inverter and an output end of the second inverter are connected in parallel and are inductive, and the method includes separately comparing a reactive current of the first inverter and a reactive current of the second inverter with a reactive current reference value, to obtain a reactive current difference of the first inverter and a reactive current difference of the second inverter, separately comparing an active current of the first inverter and an active current of the second inverter with an active current reference value, to obtain a reactive current difference of the first inverter and an active current difference of the second inverter, and adjusting an input voltage amplitude of the first inverter and an input voltage amplitude of the second inverter based on the reactive current difference of the first inverter and the reactive current difference of the second inverter, respectively, and adjusting, based on the active current difference of the first inverter and the active current difference of the second inverter, a phase difference between a carrier signal generated by the first inverter and a carrier synchronization signal and a phase difference between a carrier signal generated by the second inverter and the carrier synchronization signal, respectively such that an output current of the first inverter and an output current of the second inverter are equalized, where the carrier synchronization signal is a pulse signal simultaneously input to the two inverters.

When the output ends of the inverters are inductive, the reactive currents output by the inverters are adjusted by adjusting the input voltage amplitudes of the inverters such that the reactive currents output by the inverters are equalized, and the active currents output by the inverters are adjusted by adjusting the phase differences between the carrier signals generated by the inverters and the carrier synchronization signal such that the active currents output by the inverters are equalized.

In a first possible implementation of the first aspect, the adjusting an input voltage amplitude of the first inverter based on the reactive current difference of the first inverter further includes obtaining a first voltage fine-tuning amount based on the reactive current difference of the first inverter, adding the first voltage fine-tuning amount and a first voltage adjustment setting value to obtain a given input voltage value of the first inverter, and adjusting the input voltage amplitude of the first inverter based on the given input voltage value of the first inverter, and the adjusting an input voltage amplitude of the second inverter based on the reactive current difference of the second inverter further includes obtaining a second voltage fine-tuning amount based on the reactive current difference of the second inverter, adding the second voltage fine-tuning amount and a second voltage adjustment setting value to obtain a given input voltage value of the second inverter, and adjusting the input voltage amplitude of the second inverter based on the given input voltage value of the second inverter.

With reference to the first aspect and any one of the foregoing possible implementation, in a second possible implementation, the adjusting, based on the active current difference of the first inverter, a phase difference between a carrier signal generated by the first inverter and a carrier synchronization signal further includes obtaining a first angle fine-tuning amount based on the active current difference of the first inverter, adding the first angle fine-tuning amount and a first angle adjustment setting value to obtain a given phase value of the carrier signal generated by the first inverter, and adjusting, based on the given phase value of the carrier signal generated by the first inverter, the phase difference between the carrier signal generated by the first inverter and the carrier synchronization signal, and the adjusting, based on the active current difference of the second inverter, a phase difference between a carrier signal generated by the second inverter and the carrier synchronization signal further includes obtaining a second angle fine-tuning amount based on the active current difference of the second inverter, adding the second angle fine-tuning amount and a second angle adjustment setting value to obtain a given phase value of the carrier signal generated by the second inverter, and adjusting, based on the given phase value of the carrier signal generated by the second inverter, the phase difference between the carrier signal generated by the second inverter and the carrier synchronization signal.

A collected reactive current of an inverter is compared with the reactive current reference value to obtain a reactive current difference, the reactive current difference is input to a reactive current regulator for processing, to obtain a voltage fine-tuning amount, the voltage fine-tuning amount is added to a voltage adjustment setting value to obtain a given input voltage value, and an input voltage amplitude of the inverter is adjusted based on the given input voltage value in order to adjust the reactive current.

According to a method for adjusting a reactive current of an inverter provided in this embodiment, the input voltage amplitudes of the inverters can be adjusted such that the reactive currents output by the inverters are equalized. In addition, the reactive currents output by the inverters are equalized such that the inverters each can be in a zero-voltage switch (ZVS) operating state, to reduce a switching loss of the inverters.

With reference to the first aspect and any one of the foregoing possible implementations, in a third possible implementation, the obtaining an active current of the first inverter and an active current of the second inverter further includes collecting an output current of the first inverter as the active current of the first inverter at a midpoint moment of a positive half cycle or a negative half cycle of an output voltage of the first inverter, and collecting an output current of the second inverter as the active current of the second inverter at a midpoint moment of a positive half cycle or a negative half cycle of an output voltage of the second inverter, and the obtaining a reactive current of the first inverter and a reactive current of the second inverter further includes collecting an output current of the first inverter as the reactive current of the first inverter at a positive-negative transition moment of the output voltage of the first inverter, and collecting an output current of the second inverter as the reactive current of the second inverter at a positive-negative transition moment of the output voltage of the second inverter.

A collected active current of an inverter is compared with the active current reference value to obtain an active current difference, and the active current difference is input to an active current regulator for processing, to obtain an angle fine-tuning amount. The angle fine-tuning amount is added to an angle adjustment setting value to obtain a given carrier signal phase value, and a phase difference between a carrier signal generated by the inverter and the carrier synchronization signal is adjusted based on the given carrier signal phase value in order to adjust the active current.

With reference to the first aspect and any one of the foregoing possible implementations, in a fourth possible implementation, the output voltage of the first inverter and the output voltage of the second inverter are connected in parallel, and frequencies of the output voltages are the same as switching frequencies of the first inverter and the second inverter.

With reference to the first aspect and any one of the foregoing possible implementations, in a fifth possible implementation, the reactive current reference value is an average value of the reactive current of the first inverter and the reactive current of the second inverter, and the active current reference value is an average value of the active current of the first inverter and the active current of the second inverter.

According to a second aspect, an inverter current equalization apparatus is provided and configured to implement current equalization when output ends of a plurality of inverters are in high-frequency parallel connection, where the plurality of inverters include at least two inverters a first inverter and a second inverter, and an output end of the first inverter and an output end of the second inverter are connected in parallel and are inductive, and the current equalization apparatus includes a first inverter controller, a second inverter controller, a first inductive component, and a second inductive component, where the output end of the first inverter is connected to a common parallel-connection point using the first inductive component, the output end of the second inverter is connected to the common parallel-connection point using the second inductive component, the first inductive component enables the output end of the first inverter to be inductive, and the second inductive component enables the output end of the second inverter to be inductive, the first inverter controller is configured to compare a reactive current of the first inverter with a reactive current reference value to obtain a reactive current difference of the first inverter, and adjust an input voltage amplitude of the first inverter based on the reactive current difference of the first inverter, and further configured to compare an active current of the first inverter with an active current reference value to obtain an active current difference of the first inverter, and adjust, based on the active current difference of the first inverter, a phase difference between a carrier signal generated by the first inverter and a carrier synchronization signal, where the carrier synchronization signal is a pulse signal simultaneously input to the two inverters, and the second inverter controller is configured to compare a reactive current of the second inverter with the reactive current reference value to obtain a reactive current difference of the second inverter, and adjust an input voltage amplitude of the second inverter based on the reactive current difference of the second inverter, and further configured to compare an active current of the second inverter with the active current reference value to obtain an active current difference of the second inverter, and adjust, based on the active current difference of the second inverter, a phase difference between a carrier signal generated by the second inverter and the carrier synchronization signal.

When the output ends of the inverters are inductive, the reactive currents output by the inverters are adjusted by adjusting the input voltage amplitudes of the inverters such that the reactive currents output by the inverters are equalized, and the active currents output by the inverters are adjusted by adjusting the phase differences between the carrier signals generated by the inverters and the carrier synchronization signal such that the active currents output by the inverters are equalized. Therefore, both the reactive currents and the active currents that are output by the inverters are equalized. This can ensure that currents output by the inverters are equalized. In the current equalization apparatus, it is unnecessary to dispose a relatively large quantity of large-sized electronic hardware devices, and current equalization of the currents output by the inverters can be ensured only by adjusting the input voltage amplitudes of the inverters and the phase differences between the carrier signals generated by the inverters and the carrier synchronization signal.

In the current equalization apparatus that is provided in the foregoing embodiment and that is applicable when the inverters are in high-frequency parallel connection, a master inverter controller and a slave inverter controller may be selected from the inverter controllers such as the first inverter controller and the second inverter controller using a predetermined mechanism. The carrier synchronization signal may be generated by the master inverter controller and sent to the slave inverter controller.

In a first possible implementation of the second aspect, a master inverter controller and a slave inverter controller are selected from the first inverter controller and the second inverter controller using a predetermined mechanism, and the carrier synchronization signal is generated by the master inverter controller and sent to the slave inverter controller.

With reference to the second aspect and any one of the foregoing possible implementation, in a second possible implementation, the inverter current equalization apparatus further includes a first reactive current sampling circuit, a first active current sampling circuit, a second reactive current sampling circuit, and a second active current sampling circuit, where the first reactive current sampling circuit is configured to obtain the reactive current of the first inverter, the first active current sampling circuit is configured to obtain the active current of the first inverter, the second reactive current sampling circuit is configured to obtain the reactive current of the second inverter, the second active current sampling circuit is configured to obtain the active current of the second inverter, and the master inverter controller is configured to obtain an average reactive current value of the reactive current of the first inverter and the reactive current of the second inverter, use the average reactive current value as the reactive current reference value, and send the reactive current reference value to the slave inverter controller, and further configured to obtain an average active current value of the active current of the first inverter and the active current of the second inverter, use the average active current value as the active current reference value, and send the active current reference value to the slave inverter controller.

With reference to the second aspect and any one of the foregoing possible implementations, in a third possible implementation, the inverter current equalization apparatus further includes a first reactive current sampling circuit, a first active current sampling circuit, a second reactive current sampling circuit, and a second active current sampling circuit, where the first reactive current sampling circuit is configured to obtain the reactive current of the first inverter, the first active current sampling circuit is configured to obtain the active current of the first inverter, the second reactive current sampling circuit is configured to obtain the reactive current of the second inverter, the second active current sampling circuit is configured to obtain the active current of the second inverter, the first inverter controller is configured to obtain an average reactive current value of the reactive current of the first inverter and the reactive current of the second inverter, and use the average reactive current value as the reactive current reference value, and further configured to obtain an average active current value of the active current of the first inverter and the active current of the second inverter, and use the average active current value as the active current reference value, and the second inverter controller is configured to obtain the average reactive current value of the reactive current of the first inverter and the reactive current of the second inverter, and use the average reactive current value as the reactive current reference value, and further configured to obtain the average active current value of the active current of the first inverter and the active current of the second inverter, and use the average active current value as the active current reference value.

According to a third aspect, an inverter system is provided, including the current equalization apparatus, and further including at least the following two inverters a first inverter and a second inverter, where an input end of the first inverter is connected to a first adjustable power supply, and an input end of the second inverter is connected to a second adjustable power supply.

In a first possible implementation of the third aspect, the inverter system further includes a first direct-current-to-direct-current converter and a second direct-current-to-direct-current converter, where the first adjustable power supply is a first adjustable direct-current power supply, and the second adjustable power supply is a second adjustable direct-current power supply, the first direct-current-to-direct-current converter is configured to convert a voltage output by the first adjustable direct-current power supply, and supply a voltage obtained through conversion to the input end of the first inverter, and the second direct-current-to-direct-current converter is configured to convert a voltage output by the second adjustable direct-current power supply, and supply a voltage obtained through conversion to the input end of the second inverter.

With reference to the third aspect and any one of the foregoing possible implementation, in a second possible implementation, the inverter system further includes a first alternating-current-to-direct-current converter and a second alternating-current-to-direct-current converter, where the first adjustable power supply is a first adjustable alternating-current power supply, and the second adjustable power supply is a second adjustable alternating-current power supply, the first alternating-current-to-direct-current converter is configured to rectify the first adjustable alternating-current power supply to obtain a direct current, and supply the direct current to the input end of the first inverter, and the second alternating-current-to-direct-current converter is configured to rectify the second adjustable alternating-current power supply to obtain a direct current, and supply the direct current to the input end of the second inverter.

According to a fourth aspect, a wireless charging system is provided, including the current equalization apparatus, and further including at least the following two inverters a first inverter and a second inverter, and the wireless charging system further includes a first adjustable power supply, a second adjustable power supply, a radio transmitter circuit, and a radio receiver circuit, where an input end of the first inverter is connected to the first adjustable power supply, an input end of the second inverter is connected to the second adjustable power supply, an output end of the first inverter is connected to an input end of the radio transmitter circuit, an output end of the second inverter is connected to the input end of the radio transmitter circuit, and the radio transmitter circuit transmits electric energy in a wireless manner, and the radio receiver circuit receives, in a wireless manner, the electric energy transmitted by the radio transmitter circuit, to supply power to a load.

The current equalization apparatus provided in the foregoing embodiment may be further applied to the induction heating field. In this case, the load may be a device that needs to be heated. For example, various bar sections need to be heated for melting or deformation. Specifically, an aluminum device may be cast, and so on.

In a first possible implementation of the fourth aspect, the radio transmitter circuit includes a transmit end compensation network and a transmitting coil, and the radio receiver circuit includes a receive compensation network and a receiving coil, where an input end of the transmit end compensation network is used as the input end of the radio transmitter circuit, and an output end of the transmit end compensation network is connected to the transmitting coil, and the receiving coil is connected to an input end of the receive compensation network, and an output end of the receive compensation network is connected to the load.

It can be learned from the foregoing technical solutions that embodiments of this application have the following advantages.

The method is applied when the output ends of the at least two inverters are in high-frequency parallel connection and the output ends of the inverters are inductive. During specific implementation, the reactive currents of the inverters are compared with the reactive current reference value to obtain the reactive current differences of the inverters, and the input voltage amplitudes of the inverters are adjusted correspondingly based on the reactive current differences of the inverters, and the active currents of the inverters are compared with the active current reference value to obtain the active current differences of the inverters, and the phase differences between the carrier signals generated by the inverters and the carrier synchronization signal are adjusted based on the active current differences of the inverters. The carrier synchronization signal is a given signal.

According to the current equalization method provided in the embodiments of this application, when the output ends of the inverters are inductive, the reactive currents output by the inverters are adjusted by adjusting the input voltage amplitudes of the inverters such that the reactive currents output by the inverters are equalized, and the active currents output by the inverters are adjusted by adjusting the phase differences between the carrier signals generated by the inverters and the carrier synchronization signal such that the active currents output by the inverters are equalized. Therefore, both the reactive currents and the active currents that are output by the inverters are equalized. This can ensure that currents output by the inverters are equalized. According to the current equalization method, it is unnecessary to dispose a relatively large quantity of large-sized electronic hardware devices in a circuit, and current equalization of the currents output by the inverters can be ensured only by adjusting the input voltage amplitudes of the inverters and the phase differences between the carrier signals generated by the inverters and the carrier synchronization signal.

DESCRIPTION OF EMBODIMENTS

Figure 1:
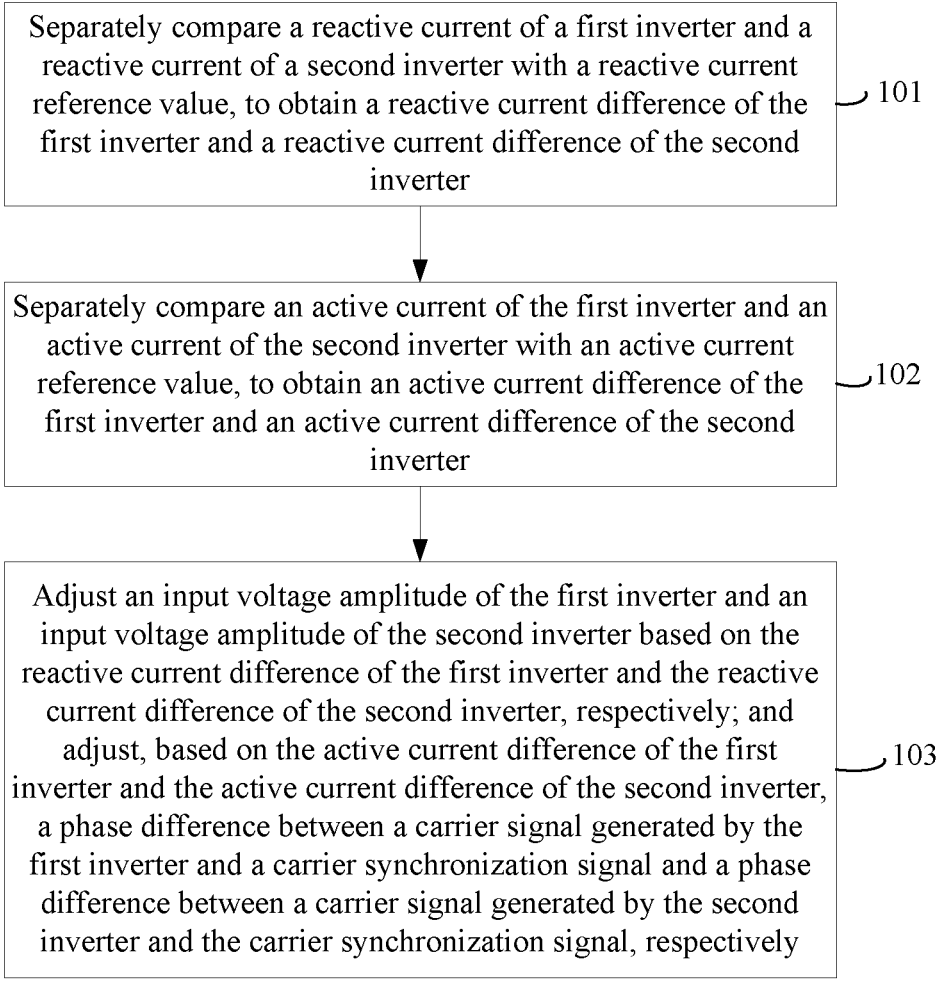
FIG. 1 is a flowchart of a current equalization method that is applicable when inverters are in high-frequency parallel connection according to method embodiment 1 of this application.

An embodiment of this application provides an inverter current equalization method, to ensure that current equalization is implemented between inverters whose output ends are connected in parallel.

Popularization of electric vehicles draws increasing attention to a problem of charging the electric vehicles. Currently, an electric vehicle is charged mainly using a wired charging pile. However, the wired charging pile has relatively low charging power, and it usually takes a relatively long time to charge the electric vehicle using the wired charging pile. The charging power of the wired charging pile needs to be improved in order to fast charge the electric vehicle. However, when the charging power of the wired charging pile is improved, technical problems, for example, a difficulty in manually holding a charging cable and an increase in maintenance costs of the charging cable, described in the Background arise.

To resolve the foregoing technical problems during wired charging, a wireless charging technology for electric vehicles emerges. An electric vehicle can be fast charged using the wireless charging technology. However, charging power still needs to be improved. For example, output ends of a plurality of inverters are connected in parallel to provide higher charging power.

In addition, in the induction heating field, a plurality of inverters also need to be in high-frequency parallel connection in order to provide higher heating power.

When a mode in the output ends of the plurality of inverters are connected in parallel is used, because the inverters may differ from each other in parameters, drive delays, or the like, output currents of the inverters are unequal. In other words, output currents of some inverters are relatively high, and output currents of some inverters are relatively low, causing uneven heat of the inverters or even explosion in a severe case.

Therefore, to prevent the above problem, it should be ensured that the output currents of the inverters connected in parallel are equalized.

Currently, the output ends of the inverters each are usually connected to a hardware device such as an inductor, to suppress current circulation and heat unevenness that are caused by unequal output currents when the plurality of inverters connected in parallel are running. In addition, to effectively suppress the current circulation, an inductor whose inductive reactance is relatively high usually needs to be selected. However, such an inductor has a large size. If the inductor is applied to an actual product, the inductor occupies relative large space, and costs are relatively high.

To resolve the foregoing technical problems, an embodiment of this application provides a current equalization method that is applicable when inverters are in high-frequency parallel connection. The method is applied when output ends of at least two inverters are in high-frequency parallel connection and the output ends of the inverters are inductive. Specifically, reactive currents of the inverters are compared with a reactive current reference value to obtain reactive current differences of the inverters, and input voltage amplitudes of the inverters are adjusted correspondingly based on the reactive current differences of the inverters, and active currents of the inverters are compared with an active current reference value to obtain active current differences of the inverters, and phase differences between carrier signals generated by the inverters and a carrier synchronization signal are adjusted based on the active current differences of the inverters. The carrier synchronization signal is a given signal.

According to the current equalization method provided in this embodiment of this application, when the output ends of the inverters are inductive, the reactive currents output by the inverters are adjusted by adjusting the input voltage amplitudes of the inverters such that the reactive currents output by the inverters are equalized, and the active currents output by the inverters are adjusted by adjusting the phase differences between the carrier signals generated by the inverters and the carrier synchronization signal such that the active currents output by the inverters are equalized. Therefore, both the reactive currents and the active currents that are output by the inverters are equalized. This can ensure that currents output by the inverters are equalized. According to the current equalization method, it is unnecessary to dispose a large-sized electronic hardware device in a circuit, and current equalization of the currents output by the inverters can be ensured only by adjusting the input voltage amplitudes of the inverters and the phase differences between the carrier signals generated by the inverters and the carrier synchronization signal.

Method Embodiment 1

Referring to FIG. 1, FIG. 1 is a flowchart of a current equalization method that is applicable when inverters are in high-frequency parallel connection according to this embodiment.

The method is used to implement current equalization when output ends of a plurality of inverters are in high-frequency parallel connection. The plurality of inverters include at least the following two inverters a first inverter and a second inverter, and an output end of the first inverter and an output end of the second inverter are connected in parallel and are inductive.

The method provided in this embodiment of this application is applicable to the inverters that are in high-frequency parallel connection. The high-frequency parallel connection means that a frequency of an output voltage of the inverters connected in parallel is the same as switching frequencies of the inverters. The frequency of the output voltage of the inverters connected in parallel is usually hundreds of Hz to hundreds of kHz. A high-frequency output voltage of an inverter is different from a power-frequency output voltage of the inverter. The high-frequency output voltage of the inverter is a square wave whose frequency is the same as a switching frequency of the inverter, and the power-frequency output voltage of the inverter is usually a power-frequency sine wave. For power-frequency output of the inverter, a high-frequency harmonic wave belongs to an interference signal and needs to be filtered out. The high-frequency output voltage of the inverter is the square wave whose frequency is the same as the switching frequency of the inverter, and therefore a high-frequency signal is not an interference signal.

The output ends of the inverters to which the method provided in this embodiment is applied need to be inductive. Specifically, this may be implemented by connecting inductors to the output ends of the inverters, respectively. Being inductive means that a phase of an output voltage of an inverter leads a phase of a current of an inductor connected to the inverter. Inductive reactance of the inductor does not need to be excessively high, ensuring that the output end of the inverter is inductive. The inductor herein is different from inductors used to implement current equalization of the plurality of inverters connected in parallel. To implement current equalization using inductors, inductive reactance of the inductors needs to be high enough, to achieve a current equalization effect. However, in the method provided in this embodiment, inductors with relatively low inductive reactance merely need to be connected to the output ends of the inverters. The inductors with relatively low inductive reactance have a relatively small size, and have relatively low costs.

The current equalization method is applicable to two or more inverters whose output ends are in high-frequency parallel connection. For ease of description, in this embodiment, two inverters with output ends connected in parallel are used as an example for description. The current equalization method includes the following steps.

Step 101. Separately compare a reactive current of the first inverter and a reactive current of the second inverter with a reactive current reference value, to obtain a reactive current difference of the first inverter and a reactive current difference of the second inverter. Because the output ends of the inverters are inductive, the reactive currents output by the inverters can be adjusted by adjusting input voltage amplitudes of the inverters.

Usually, output currents of the inverters may be sampled using a current sensor such as a Hall element or a current transformer (CT), and are split up into active currents and reactive currents to obtain the reactive currents output by the inverters, and the reactive currents output by the inverters are compared with the reactive current reference value. Alternatively, the sampling may be performed using a location relationship between a reactive current and an output voltage.

Figure 2A:
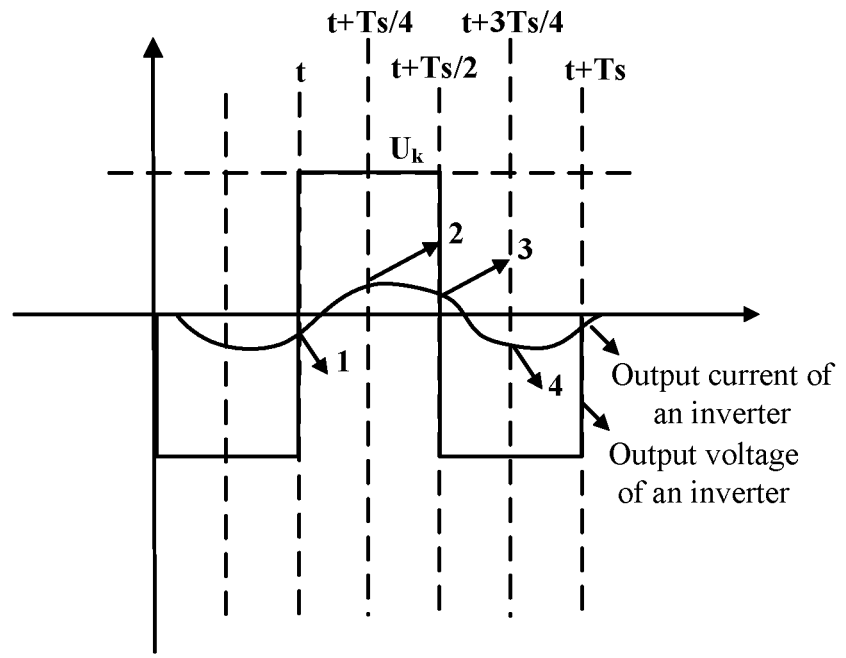
FIG. 2A is a waveform graph of an output current of an inverter and an output voltage of the inverter.

Specifically, the output currents of the inverters are collected as the reactive currents of the inverters at positive-negative transition moments of output voltages of the inverters. It should be noted that positive-negative transition of an output voltage of an inverter includes transition of the output voltage from positive to negative and includes transition of the output voltage from negative to positive. As shown in FIG. 2A, a current value corresponding to a point 1 and a current value corresponding to a point 3 are values of a reactive current output by an inverter.

In addition, after the reactive currents of the inverters are obtained, an average value of the reactive currents of the inverters may be calculated, and the average value of the reactive currents is used as the reactive current reference value. Certainly, a current value may alternatively be set as the reactive current reference value based on an actual condition. No limitation is imposed herein to a method for determining the reactive current reference value.

Specifically, the reactive current differences may be differences that are obtained by subtracting the reactive current reference value from the reactive currents output by the inverters.

Step 102. Separately compare an active current of the first inverter and an active current of the second inverter with an active current reference value, to obtain an active current difference of the first inverter and an active current difference of the second inverter.

Because the output ends of the inverters are inductive, the active currents output by the inverters can be adjusted by adjusting phase differences between carrier signals generated by the inverters and a carrier synchronization signal.

Usually, the output currents of the inverters may be sampled using the current sensor such as the Hall element or the CT, and are split up into active currents and reactive currents to obtain the active currents output by the inverters, and the active currents output by the inverters are compared with the active current reference value. Alternatively, the sampling may be performed using a location relationship between an active current and an output voltage. Specifically, the output currents of the inverters are collected as the active currents of the inverters at midpoint moments of positive half cycles or negative half cycles of the output voltages of the inverters. As shown in FIG. 2A, a current value corresponding to a point 2 and a current value corresponding to a point 4 are values of an active current output by an inverter.

An average value of the active currents of the inverters is obtained using the active currents of the inverters, and the average value of the active currents may be used as the active current reference value. Certainly, a current value may alternatively be set as the active current reference value based on an actual condition. No limitation is imposed herein to a method for determining the active current reference value.

Specifically, the active current differences may be differences that are obtained by subtracting the active current reference value from the active currents output by the inverters.

Step 103. Adjust an input voltage amplitude of the first inverter and an input voltage amplitude of the second inverter based on the reactive current difference of the first inverter and the reactive current difference of the second inverter, respectively, and adjust, based on the active current difference of the first inverter and the active current difference of the second inverter, a phase difference between a carrier signal generated by the first inverter and a carrier synchronization signal and a phase difference between a carrier signal generated by the second inverter and the carrier synchronization signal, respectively such that an output current of the first inverter and an output current of the second inverter are equalized, where the carrier synchronization signal is a pulse signal simultaneously input to the two inverters.

The input voltage amplitudes of the inverters are adjusted based on the reactive current differences of the inverters, and further the reactive currents output by the inverters are adjusted such that differences between the reactive currents of the inverters and the reactive current reference value fall within a preset range. In other words, the reactive currents of the inverters approximate to or are equal to the reactive current reference value. Therefore, the reactive currents of the inverters are equalized.

The phase differences between the carrier signals generated by the inverters and the carrier synchronization signal are adjusted based on the active current differences of the inverters, and further the active currents of the inverters are adjusted such that differences between the active currents of the inverters after the adjustment and the active current reference value fall within a preset range. In other words, the active currents of the inverters approximate to or are equal to the active current reference value. Therefore, the active currents of the inverters are equalized.

Step 101 and step 102 are two independent steps, and there is no sequence between step 101 and step 102. Usually, step 101 and step 102 need to be simultaneously performed. In other words, the reactive currents and the active currents of the inverters need to be simultaneously adjusted, to ensure that the reactive currents and the active currents of the inverters are simultaneously equalized, and ensure that currents output by the inverters are equalized.

To understand the method provided in this embodiment of this application more intuitively by persons skilled in the art, the following describes a principle for adjusting an active current and a principle for adjusting a reactive current with reference to a droop characteristic curve.

Figure 2B:
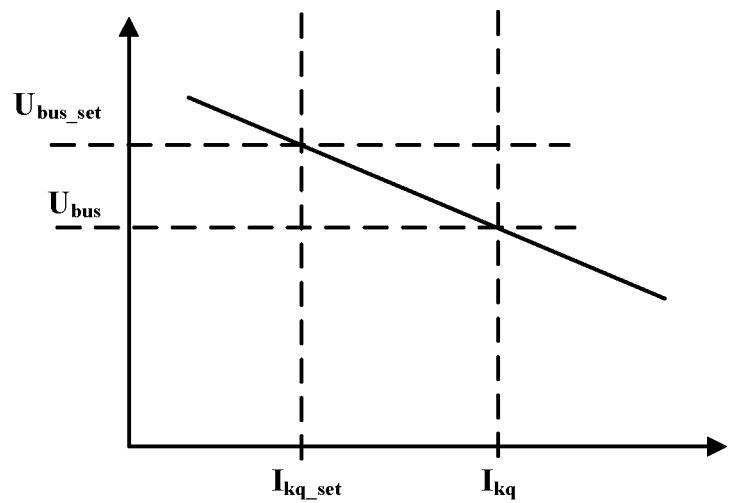
FIG. 2B is a schematic diagram of a droop characteristic curve of an input voltage of an inverter and a reactive current of the inverter.

Referring to FIG. 2B, FIG. 2B is a schematic diagram of a droop characteristic curve of an input voltage of an inverter and a reactive current of the inverter.

It can be learned from FIG. 2B that a horizontal axis indicates the reactive current, a vertical axis indicates the input voltage, and a straight line indicates a droop characteristic of the input voltage and the reactive current. When the reactive current is $I_{kq\_set}$, a corresponding input voltage is $U_{bus\_set}$. When the reactive current is $I_{kq}$, a corresponding input voltage is $U_{bus}$. In other words, different reactive currents correspond to different input voltages. However, the input voltages and the reactive currents satisfy the droop characteristic shown in FIG. 2B.

Figure 2C:
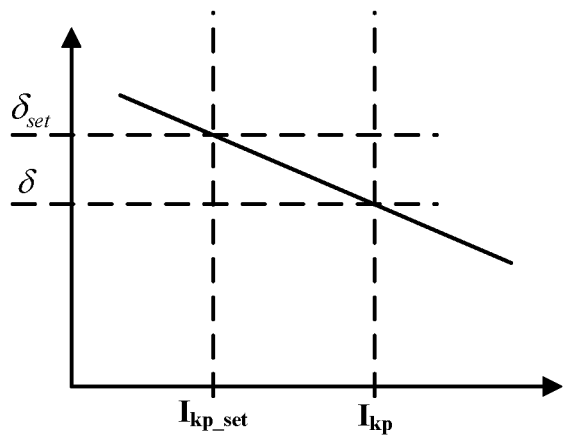
FIG. 2C is a schematic diagram of a droop characteristic curve of a phase difference between a carrier synchronization signal and a carrier signal of an inverter and an active current of the inverter.

Referring to FIG. 2C, FIG. 2C is a schematic diagram of a droop characteristic curve of a phase difference between a carrier synchronization signal and a carrier signal of an inverter and an active current of the inverter.

It can be learned from FIG. 2C that a horizontal axis indicates the active current, a vertical axis indicates the phase difference, and a straight line indicates a droop characteristic of the phase difference and the active current. When the active current is $I_{kp\_set}$, a corresponding phase difference is $\delta_{set}$. When the active current is $I_{kp}$, a corresponding phase difference is $\delta$. In other words, different active currents correspond to different phase differences. However, the phase differences and the active currents satisfy the droop characteristic shown in FIG. 2C.

The droop characteristic shown in FIG. 2B and FIG. 2C is satisfied only when an output end of the inverter is inductive.

The following describes, with reference to an actual application scenario, the current equalization method provided in this embodiment.

Figure 3:
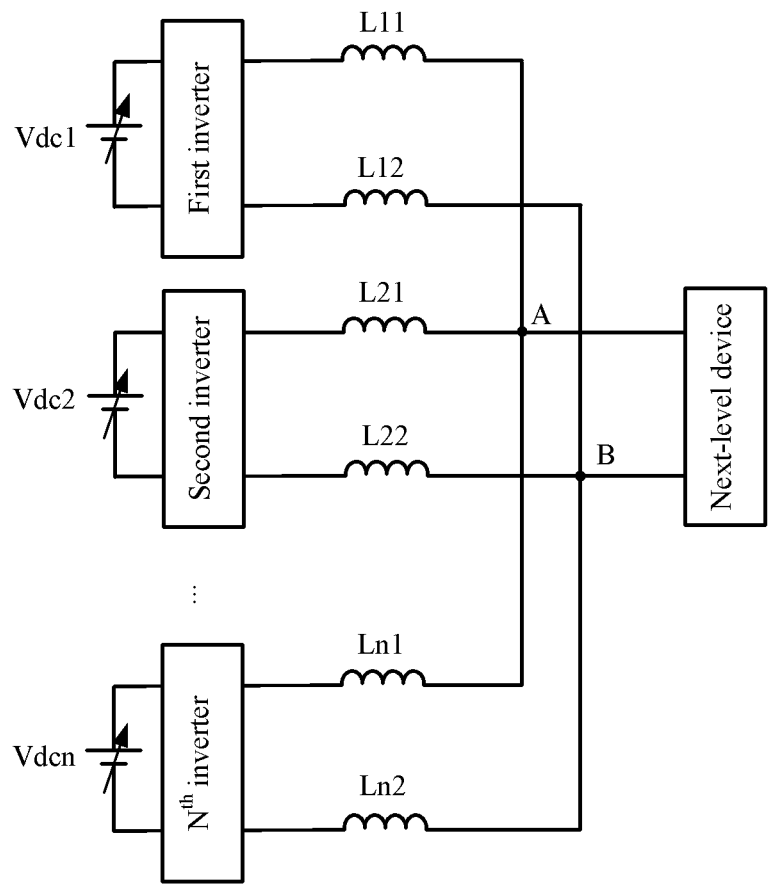
FIG. 3 is a circuit diagram of a current equalization circuit according to an embodiment of this application.

As shown in FIG. 3, FIG. 3 is a circuit diagram of a current equalization circuit provided based on the current equalization method according to this embodiment.

The current equalization circuit may be applied to the wireless charging field, to provide relatively high charging power and implement fast charging, or may be applied to the induction heating field, to provide relatively high power and implement quick heating.

A first inverter to an $N^{th}$ inverter are all inverters. The first to the $N^{th}$ inverters are connected in parallel, and a positive output end and a negative output end of each inverter each are connected to an inductor in series, to ensure that output ends of the inverters are inductive.

Input ends of the inverters each are connected to a standalone variable direct-current power supply, to adjust input voltage amplitudes of the inverters. Reactive currents output by the inverters are adjusted by adjusting the input voltage amplitudes of the inverters such that the reactive currents output by the inverters are equalized. Active currents output by the inverters may be adjusted by adjusting phase differences between carrier signals generated by the inverters and a carrier synchronization signal such that the active currents output by the inverters are equalized.

The inverters are connected in parallel to a positive common parallel-connection point A and a negative common parallel-connection point B using inductors, and two ends of a next-level device are connected to the positive common parallel-connection point A and the negative common parallel-connection point B, respectively. Specifically, the next-level device may be a component such as a transmit end compensation network or a transmitting coil, to convert a high-frequency alternating current into an alternating magnetic field on a transmitting coil, and convert, through electromagnetic induction, the alternating magnetic field into an alternating-current voltage or a direct-current voltage that can supply power to another load, to implement wireless charging.

According to the current equalization method provided in this embodiment, when the output ends of the inverters are inductive, the reactive currents output by the inverters are adjusted by adjusting the input voltage amplitudes of the inverters such that the reactive currents output by the inverters are equalized, and the active currents output by the inverters are adjusted by adjusting the phase differences between the carrier signals generated by the inverters and the carrier synchronization signal such that the active currents output by the inverters are equalized. Therefore, both the reactive currents and the active currents that are output by the inverters are equalized. This can ensure that currents output by the inverters are equalized. According to the current equalization method, it is unnecessary to dispose a relatively large quantity of large-sized electronic hardware devices in a circuit, and current equalization of the currents output by the inverters can be ensured only by adjusting the input voltage amplitudes of the inverters and the phase differences between the carrier signals generated by the inverters and the carrier synchronization signal.

The method provided in this embodiment is applied to high-frequency parallel connection of inverters. This is different from power-frequency parallel connection of inverters. Grid-connected photovoltaic power generation belongs to the power-frequency parallel connection of inverters. A pulse-width modulation (PWM) technology is used for current equalization control of a plurality of inverters connected in parallel in the grid-connected photovoltaic power generation field. In an embodiment, the current equalization control is implemented by adjusting a conducted pulse width of each bridge arm switching transistor. However, in this embodiment, current equalization of the inverters is not implemented by adjusting PWM. Instead, current equalization control is implemented by adjusting direct-current bus voltages of the inverters and the phase differences between the carrier signals generated by the inverters and the carrier synchronization signal.

In addition, the method provided in this embodiment of this application can implement equal reactive currents of the inverters and equal active currents of the inverters. When the reactive currents of the inverters are equal, total reactive power is equally shared such that switching transistors of the inverters achieve an effect of a ZVS, reducing power consumption of the switch transistors and improving electric energy efficiency.

In the current equalization method provided in this embodiment of this application, current equalization is implemented by adjusting the reactive currents and the active currents of the inverters, thereby achieving an effect of current equalization of the output currents of the inverters. The following separately describes in detail a method for adjusting a reactive current and a method for adjusting an active current.

First, a method for adjusting a reactive current of an inverter is described.

Method Embodiment 2

Figure 4:
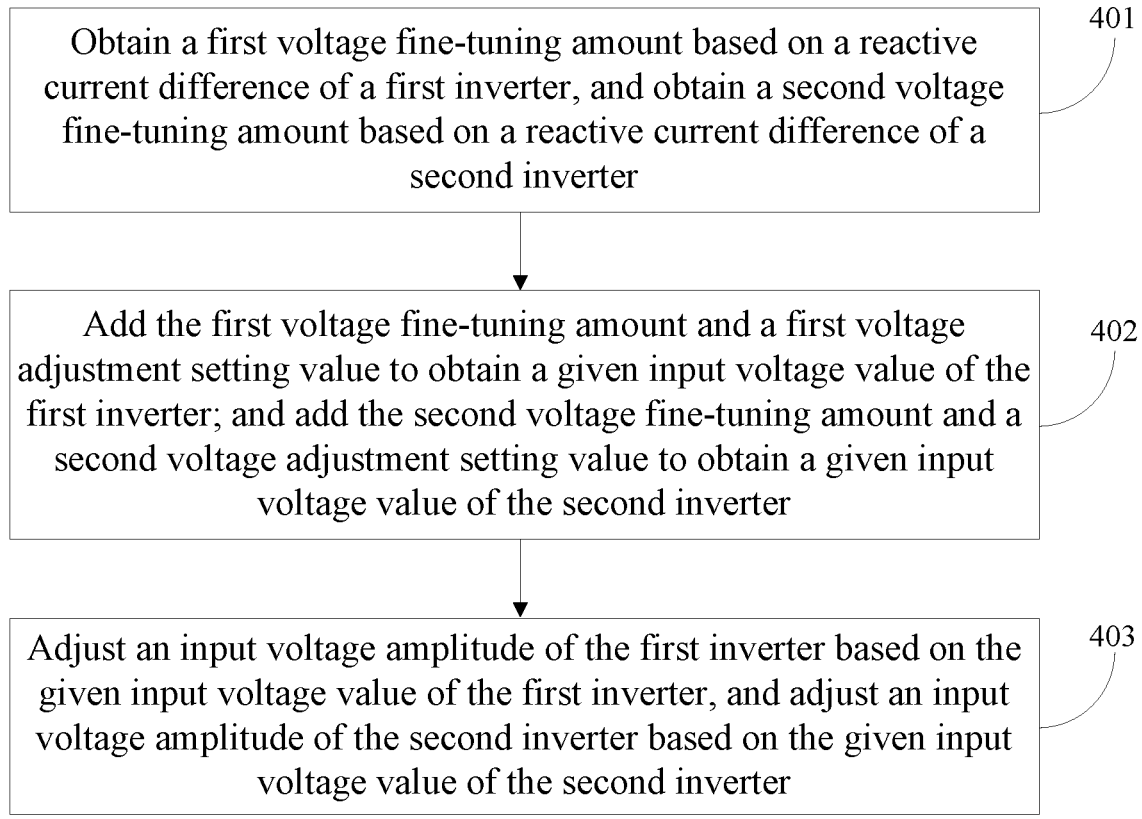
FIG. 4 is a flowchart of a method for adjusting a reactive current of an inverter according to method embodiment 2 of this application.

Referring to FIG. 4, FIG. 4 is a flowchart of a method for adjusting a reactive current of an inverter according to this embodiment.

The method for adjusting a reactive current is applicable to two or more inverters whose output ends are in high-frequency parallel connection. For ease of description, in this embodiment, two inverters with output ends connected in parallel are used as an example for description. The method includes the following steps.

Step 401. Obtain a first voltage fine-tuning amount based on a reactive current difference of a first inverter, and obtain a second voltage fine-tuning amount based on a reactive current difference of a second inverter.

After the reactive current differences of the inverters are obtained, the reactive current differences of the inverters are correspondingly input to a reactive current regulator. After the reactive current regulator performs compensation processing, voltage fine-tuning amounts corresponding to different inverters are obtained.

Each inverter may be correspondingly equipped with one reactive current regulator, to obtain voltage fine-tuning amounts corresponding to the inverters. Certainly, the voltage fine-tuning amounts corresponding to the inverters may be obtained for a plurality of inverters using one reactive current regulator. This is not limited herein.

Step 402. Add the first voltage fine-tuning amount and a first voltage adjustment setting value to obtain a given input voltage value of the first inverter, and add the second voltage fine-tuning amount and a second voltage adjustment setting value to obtain a given input voltage value of the second inverter.

The voltage fine-tuning amounts of the inverters obtained in step 401 are added correspondingly to the voltage adjustment setting values of the inverters to obtain given input voltage values of the inverters.

The voltage adjustment setting values of the inverters each are a preset value. Usually, the voltage adjustment setting values of the inverters are set based on an actual condition. Specifically, the voltage adjustment setting values of the inverters may be set based on power required by a next-level load that is connected to the inverters.

Step 403. Adjust an input voltage amplitude of the first inverter based on the given input voltage value of the first inverter, and adjust an input voltage amplitude of the second inverter based on the given input voltage value of the second inverter.

The input voltage amplitudes of the inverters are adjusted correspondingly based on the given input voltage values of the inverters obtained in step 402.

Specifically, variable direct-current power supplies connected to the inverters may be adjusted, to correspondingly adjust voltage amplitudes output by the variable direct-current power supplies to the given input voltage values obtained in step 402. Certainly, the input voltage amplitudes of the inverters may be correspondingly adjusted to the given input voltage values by adjusting transformer devices connected to the inverters.

Reactive currents output by the inverters are adjusted by adjusting the input voltage amplitudes such that differences between the reactive currents output by the inverters and a reactive current reference value falls within a preset range. In other words, the reactive currents output by the inverters reach the reactive current reference value or approximate to the reactive current reference value, thereby implementing current equalization of the reactive currents output by the inverters.

Figure 5:
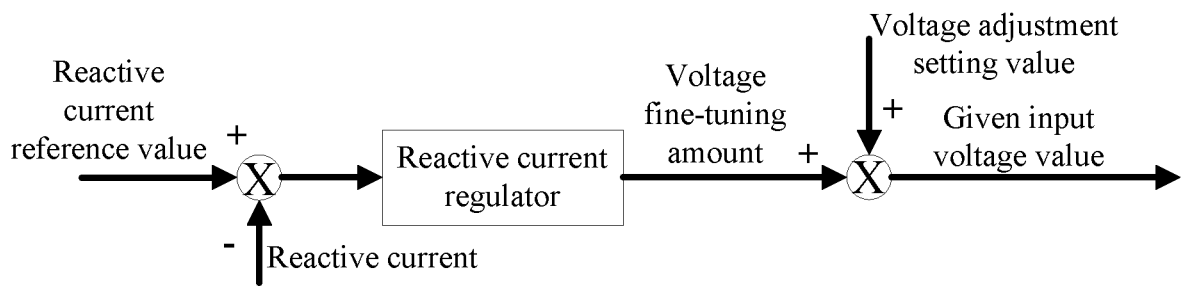
FIG. 5 is a schematic diagram of a process of adjusting a reactive current of an inverter according to method embodiment 2 of this application.

As shown in FIG. 5, FIG. 5 is a schematic diagram of a process of adjusting a reactive current of an inverter.

A collected reactive current of an inverter is compared with the reactive current reference value to obtain a reactive current difference, the reactive current difference is input to a reactive current regulator for processing, to obtain a voltage fine-tuning amount, the voltage fine-tuning amount is added to a voltage adjustment setting value to obtain a given input voltage value, and an input voltage amplitude of the inverter is adjusted based on the given input voltage value in order to adjust the reactive current.

According to the method for adjusting a reactive current of an inverter provided in this embodiment, the input voltage amplitudes of the inverters can be adjusted such that the reactive currents output by the inverters are equalized. In addition, the reactive currents output by the inverters are equalized such that the inverters each can be in a ZVS operating state, to reduce a switching loss of the inverters.

The following describes a method for adjusting an active current of an inverter.

Method Embodiment 3

Figure 6:
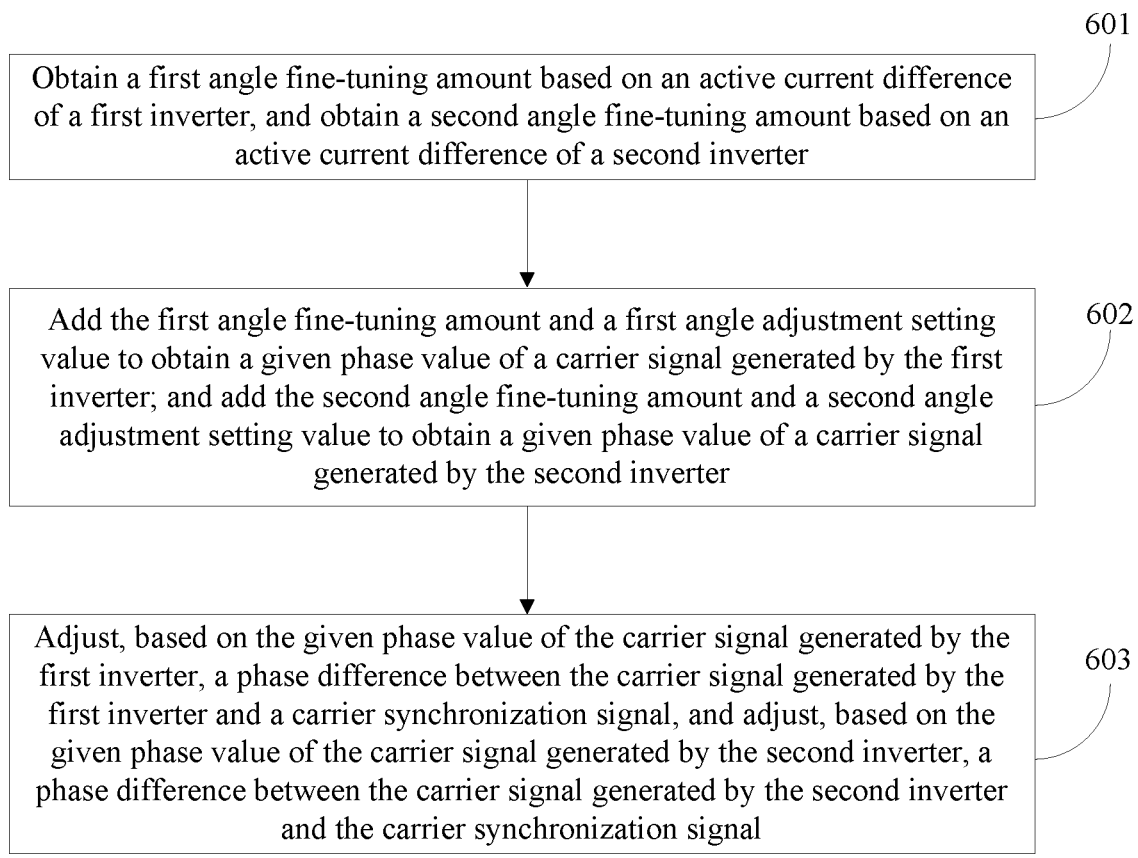
FIG. 6 is a flowchart of a method for adjusting an active current of an inverter according to method embodiment 3 of this application.

Referring to FIG. 6, FIG. 6 is a flowchart of a method for adjusting an active current of an inverter according to this embodiment. The method is applicable to two or more inverters whose output ends are in high-frequency parallel connection. For ease of description, in this embodiment, two inverters with output ends connected in parallel are used as an example for description. The current equalization method includes the following steps.

Step 601. Obtain a first angle fine-tuning amount based on an active current difference of a first inverter, and obtain a second angle fine-tuning amount based on an active current difference of a second inverter.

After the active current differences of the inverters are obtained, the active current differences of the inverters are correspondingly input to an active current regulator. After the active current regulator performs compensation processing, angle fine-tuning amounts corresponding to different inverters are obtained.

It should be noted that each inverter may be correspondingly equipped with one active current regulator, to obtain angle fine-tuning amounts corresponding to the inverters. Certainly, the angle fine-tuning amounts corresponding to the inverters may be obtained for a plurality of inverters using one active current regulator. This is not limited herein.

Step 602. Add the first angle fine-tuning amount and a first angle adjustment setting value to obtain a given phase value of a carrier signal generated by the first inverter, and add the second angle fine-tuning amount and a second angle adjustment setting value to obtain a given phase value of a carrier signal generated by the second inverter.

The angle fine-tuning amounts of the inverters obtained in step 601 are added correspondingly to angle adjustment setting values of the inverters to obtain given phase values of carrier signals generated by the inverters.

The angle adjustment setting values of the inverters each are a preset angle value. The angle adjustment setting value is specifically related to power of a connected next-level device. If the power of the connected next-level device is changed, the angle adjustment setting value also needs to be changed correspondingly. The angle adjustment setting value may be 0. Certainly, the angle adjustment setting value may be set to any angle value based on an actual condition. This is not limited herein.

Step 603. Adjust, based on the given phase value of the carrier signal generated by the first inverter, a phase difference between the carrier signal generated by the first inverter and a carrier synchronization signal, and adjust, based on the given phase value of the carrier signal generated by the second inverter, a phase difference between the carrier signal generated by the second inverter and the carrier synchronization signal.

The phase differences between the carrier signals generated by the inverters and the carrier synchronization signal are adjusted correspondingly based on the given phase values, obtained in step 602, of the carrier signals generated by the inverters.

Specifically, the carrier signals generated by the inverters may be adjusted such that the phase differences between the carrier signals generated by the inverters and the carrier synchronization signal are the given phase values of the carrier signals generated by the inverters.

The phase differences between the carrier signals generated by the inverters and the carrier synchronization signal are directly proportional to active currents of the inverters. Therefore, the phase differences between the carrier signals generated by the inverters and the carrier synchronization signal are adjusted such that differences between active currents output by the inverters and an active current reference value can fall within a preset range. In other words, the active currents output by the inverters reach or approximate to the active current reference value, thereby implementing current equalization of the active currents output by the inverters.

Figure 7A:
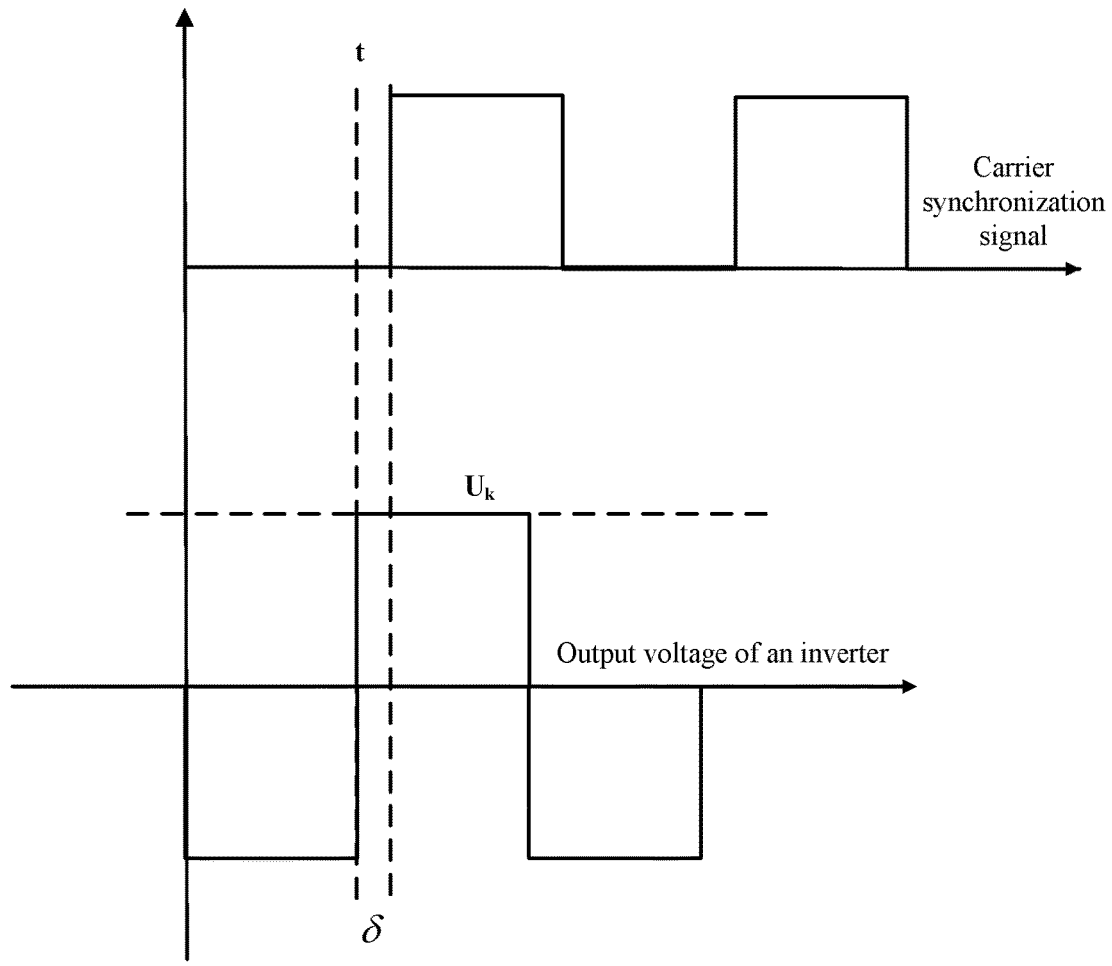
FIG. 7A is a waveform graph of an output voltage of an inverter and a carrier synchronization signal.

As shown in FIG. 7A, a phase of an output voltage of an inverter may represent a carrier signal generated by the inverter, and a phase difference angle δ between the phase of the output voltage and a carrier synchronization signal is a phase difference between the carrier signal generated by the inverter and the carrier synchronization signal.

Figure 7B:
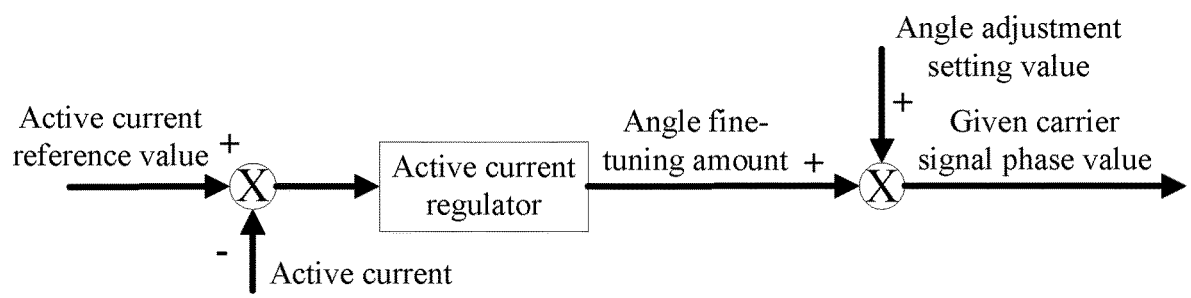
FIG. 7B is a schematic diagram of a process of adjusting an active current of an inverter according to method embodiment 3 of this application.

As shown in FIG. 7B, FIG. 7B is a schematic diagram of a process of adjusting an active current of an inverter.

A collected active current of an inverter is compared with the active current reference value to obtain an active current difference, and the active current difference is input to an active current regulator for processing, to obtain an angle fine-tuning amount. The angle fine-tuning amount is added to an angle adjustment setting value to obtain a given carrier signal phase value, and a phase difference between a carrier signal generated by the inverter and the carrier synchronization signal is adjusted based on the given carrier signal phase value in order to adjust the active current.

According to the method for adjusting an active current of an inverter provided in this embodiment, the active currents output by the inverters can be adjusted by adjusting the phase differences between the carrier signals generated by the inverters and the carrier synchronization signal, to implement current equalization.

With reference to the method for adjusting a reactive current of an inverter provided in method embodiment 2, when both the active currents and the reactive currents are equalized, currents output by the inverters connected in parallel are adjusted to implement current equalization.

Based on the current equalization method that is provided in the foregoing embodiments and that is applicable when the inverters are in high-frequency parallel connection, an embodiment of this application further provides a current equalization apparatus that is applicable when inverters are in high-frequency parallel connection. The following describes in detail an operating principle of the current equalization apparatus with reference to the accompanying drawings.

Apparatus Embodiment 1

Figure 8A:
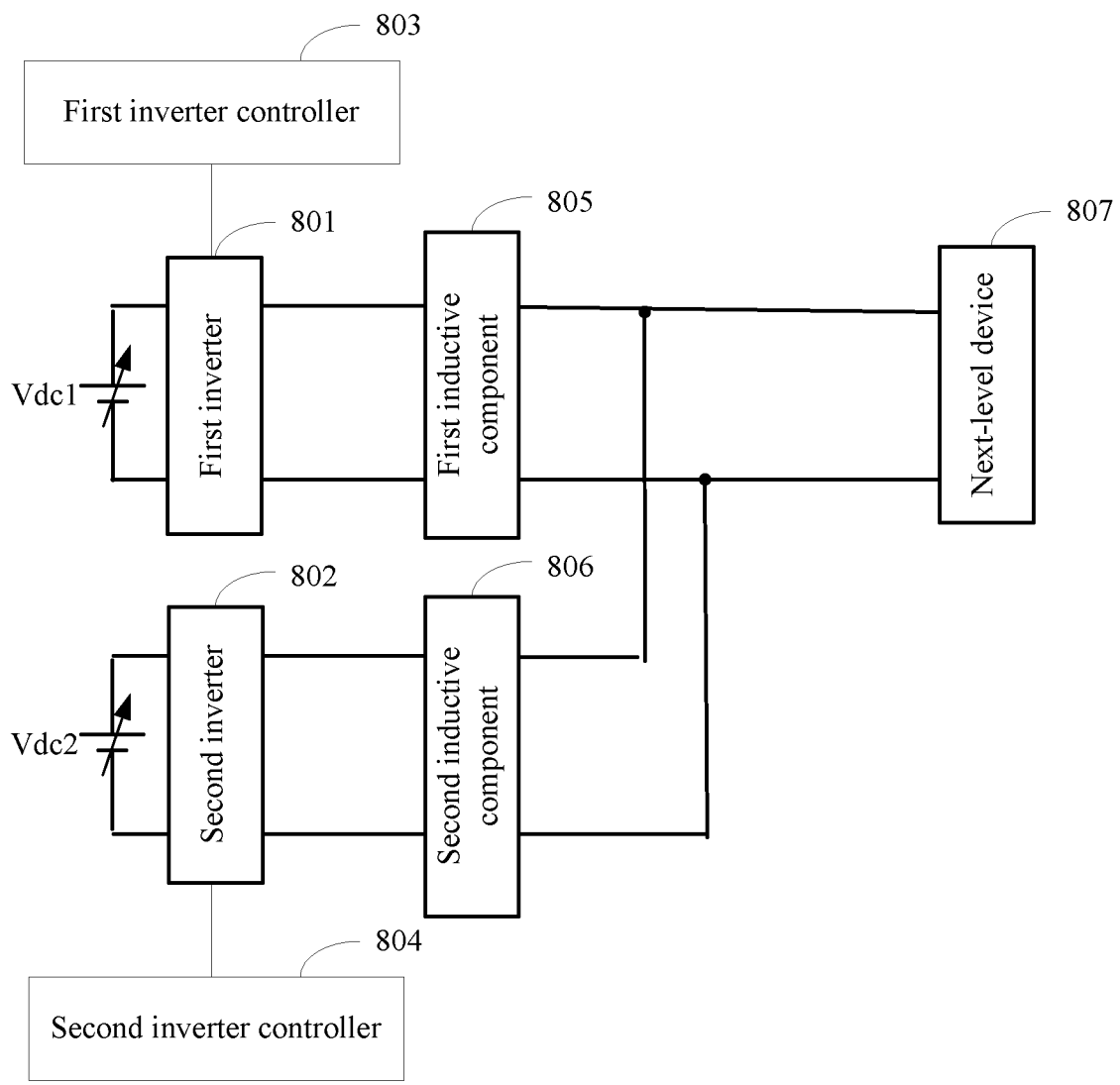
FIG. 8A is a structural diagram of a current equalization apparatus that is applicable when inverters are in high-frequency parallel connection according to apparatus embodiment 1 of this application.

Referring to FIG. 8A, FIG. 8A is a structural diagram of a current equalization apparatus that is applicable when inverters are in high-frequency parallel connection according to this embodiment.

The apparatus is applied to at least the following two inverters whose output ends are in high-frequency parallel connection. The two inverters include a first inverter 801 and a second inverter 802.

The current equalization apparatus includes a first inverter controller 803, a second inverter controller 804, a first inductive component 805, and a second inductive component 806.

The current equalization apparatus is applicable to two or more inverters whose output ends are in high-frequency parallel connection. For ease of description, in this embodiment, two inverters with output ends connected in parallel are used as an example for description. Each inverter is equipped with a corresponding inverter controller, and inverter controllers may communicate with each other.

It should be noted that structures of the inverters may be the same, and structures of the inverter controllers may also be the same.

An output end of the first inverter 801 is connected to a common parallel-connection point using the first inductive component 805, an output end of the second inverter 802 is connected to the common parallel-connection point using the second inductive component 806, the first inductive component 805 enables the output end of the first inverter to be inductive, and the second inductive component 806 enables the output end of the second inverter to be inductive.

A next-level device 807 is connected to the first inductive component 805 and the second inductive component 806. The next-level device 807 may be a device, such as a transmit end compensation network or a transmitting coil, used for charging a load.

The first inverter controller 803 is configured to compare a reactive current of the first inverter 801 with a reactive current reference value to obtain a reactive current difference of the first inverter 801, and adjust an input voltage amplitude of the first inverter 801 based on the reactive current difference of the first inverter 801, and further configured to compare an active current of the first inverter 801 with an active current reference value to obtain an active current difference of the first inverter 801, and adjust, based on the active current difference of the first inverter 801, a phase difference between a carrier signal generated by the first inverter 801 and a carrier synchronization signal.

The second inverter controller 804 is configured to compare a reactive current of the second inverter 802 with the reactive current reference value to obtain a reactive current difference of the second inverter 802, and adjust an input voltage amplitude of the second inverter 802 based on the reactive current difference of the second inverter 802, and further configured to compare an active current of the second inverter 802 with the active current reference value to obtain an active current difference of the second inverter 802, and adjust, based on the active current difference of the second inverter 802, a phase difference between a carrier signal generated by the second inverter 802 and the carrier synchronization signal. The carrier synchronization signal is a pulse signal simultaneously input to the two inverters.

Figure 8B:
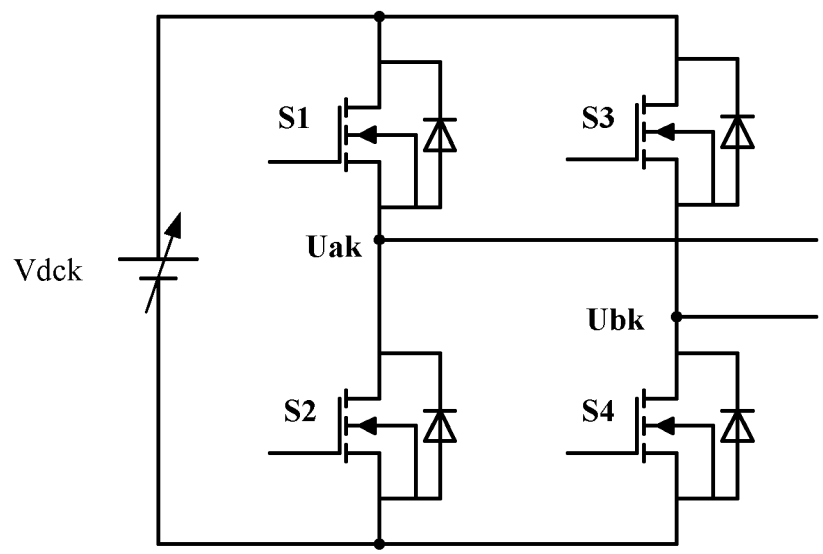
FIG. 8B is a structural diagram of an H-bridge inverter.

The first inverter 801 and the second inverter 802 may be inverters having an H-bridge structure. As shown in FIG. 8B, switching transistors S1 and S2 form a bridge arm 1, switching transistors S3 and S4 form a bridge arm 2, Uak is a midpoint voltage of the bridge arm 1, Ubk is a midpoint voltage of the bridge arm 2, and a difference between Uak and Ubk is an output voltage of the inverter. The output voltage of the inverter may be adjusted by adjusting an adjustable direct-current power supply Vdck.

The apparatus shown in FIG. 8A in this embodiment is an apparatus corresponding to method embodiment 1. For the specific method, refer to the descriptions in method embodiment 1. No details are described herein again.

According to the current equalization apparatus provided in this embodiment, when the output ends of the inverters are inductive, the reactive currents output by the inverters are adjusted by adjusting the input voltage amplitudes of the inverters such that the reactive currents output by the inverters are equalized, and the active currents output by the inverters are adjusted by adjusting the phase differences between the carrier signals generated by the inverters and the carrier synchronization signal such that the active currents output by the inverters are equalized. Therefore, both the reactive currents and the active currents that are output by the inverters are equalized. This can ensure that currents output by the inverters are equalized. In the current equalization apparatus, it is unnecessary to dispose a relatively large quantity of large-sized electronic hardware devices, and current equalization of the currents output by the inverters can be ensured only by adjusting the input voltage amplitudes of the inverters and the phase differences between the carrier signals generated by the inverters and the carrier synchronization signal.

In the current equalization apparatus that is provided in the foregoing embodiment and that is applicable when the inverters are in high-frequency parallel connection, a master inverter controller and a slave inverter controller may be selected from the inverter controllers such as the first inverter controller and the second inverter controller using a predetermined mechanism. The carrier synchronization signal may be generated by the master inverter controller and sent to the slave inverter controller.

Specifically, the master inverter controller may be determined based on a power-on sequence. In an embodiment, an inverter controller that is first powered on is determined as the master inverter controller in the inverter controllers, and another inverter controller is determined as the slave inverter controller. Certainly, the master inverter controller and the slave inverter controller may alternatively be selected using another predetermined mechanism. This is not limited herein.

After the master inverter controller and the slave inverter controller are selected, the current equalization apparatus provided in this application usually uses the following two implementations to determine and send the reactive current reference value and the active current reference value to the inverter controllers.

In a first implementation, the master inverter controller determines the reactive current reference value and the active current reference value of the current equalization apparatus, and the master inverter controller sends the reactive current reference value and the active current reference value to each slave inverter controller.

In a second implementation, the master inverter controller and each slave inverter controller determine the reactive current reference value and the active current reference value of the current equalization apparatus, and the master inverter controller and each slave inverter controller directly use the reactive current reference value and the active current reference value that are determined by the master inverter controller and each slave inverter controller.

The following specifically describes the foregoing two implementations.

It should be noted that current equalization apparatuses in the following embodiments are applicable to two or more inverters whose output ends are in high-frequency parallel connection. For ease of description, in all the following embodiments, two inverters with output ends connected in parallel are used as an example for description.

Each inverter is equipped with a corresponding inverter controller, and inverter controllers may communicate with each other. In addition, for all the current equalization apparatuses in the following embodiments, it is assumed that a first inverter controller is a master inverter controller, and another inverter controller is a slave inverter controller.

First, a current equalization apparatus in the first implementation is described.

Apparatus Embodiment 2

Figure 9:
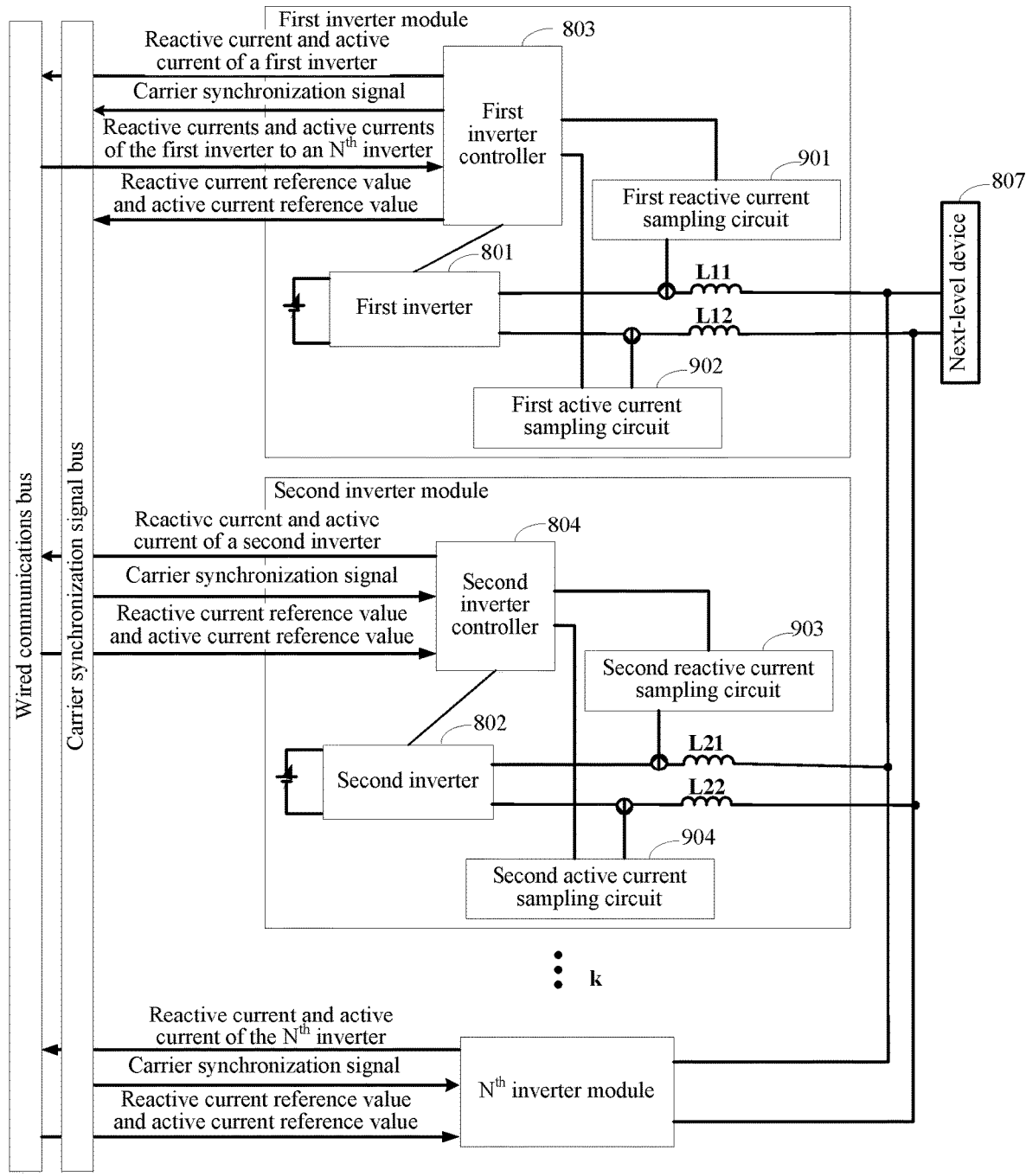
FIG. 9 is a structural diagram of a current equalization apparatus that is applicable when inverters are in high-frequency parallel connection according to apparatus embodiment 2 of this application.

Referring to FIG. 9, FIG. 9 is a structural diagram of another current equalization apparatus that is applicable when inverters are in high-frequency parallel connection according to this embodiment.

In addition to the components included in apparatus embodiment 1, the current equalization apparatus further includes a first reactive current sampling circuit 901, a first active current sampling circuit 902, a second reactive current sampling circuit 903, and a second active current sampling circuit 904.

The first reactive current sampling circuit 901 is configured to obtain a reactive current of a first inverter 801.

The first active current sampling circuit 902 is configured to obtain an active current of the first inverter 801.

The second reactive current sampling circuit 903 is configured to obtain a reactive current of a second inverter 802.

The second active current sampling circuit 904 is configured to obtain an active current of the second inverter 802.

A master inverter controller is configured to obtain an average reactive current value of the reactive current of the first inverter 801 and the reactive current of the second inverter 802, use the average reactive current value as the reactive current reference value, and send the reactive current reference value to a slave inverter controller, and further configured to obtain an average active current value of the active current of the first inverter 801 and the active current of the second inverter 802, use the average active current value as an active current reference value, and send the active current reference value to the slave inverter controller.

As shown in FIG. 9, a first inverter controller 803 is the master inverter controller. The master inverter controller sends a carrier synchronization signal to a carrier synchronization signal bus, and the carrier synchronization signal bus sends the carrier synchronization signal to the slave inverter controllers.

As shown in FIG. 9, the first reactive current sampling circuit 901 collects the reactive current of the first inverter, and sends the collected reactive current of the first inverter to the first inverter controller 803. The first active current sampling circuit 902 collects the active current of the first inverter, and sends the collected active current of the first inverter to the first inverter controller 803.

The first reactive current sampling circuit 901 and the first active current sampling circuit 902 may collect the reactive current and the active current of the first inverter both from a positive output end of the first inverter, or collect the reactive current and the active current of the first inverter both from a negative output end of the first inverter, or collect the reactive current and the active current of the first inverter from the positive output end of the first inverter and the negative output end of the first inverter, respectively. Locations at which the first reactive current sampling circuit and the first active current sampling circuit collect the currents are not limited herein.

The first inverter controller 803 sends the reactive current and the active current of the first inverter to a wired communications bus.

Operating modes in which a reactive current and an active current are collected and sent by other inverter modules are the same as an operating mode of a first inverter module. Details are not described herein again.

Serving as the master inverter controller, the first inverter controller 803 collects the reactive currents and the active currents that are sent by the inverters to the wired communications bus, calculates an average reactive current value based on the reactive currents sent by the inverters, and uses the average reactive current value as the reactive current reference value, and calculates an average active current value based on the active currents sent by the inverters, and uses the average active current value as the active current reference value.

The first inverter controller 803 sends the reactive current reference value and the active current reference value to the wired communications bus, and the wired communications bus sends the reactive current reference value and the active current reference value to the other inverter controllers.

Serving as slave inverter controllers, other inverter controllers receive the reactive current reference value and the active current reference value that are sent by the master inverter controller to the wired communications bus, and further adjust, based on the reactive current reference value and the active current reference value, the reactive currents and the active currents of the inverters.

According to the current equalization apparatus provided in this embodiment, the master inverter controller and the slave inverter controller are determined from the inverter controllers, the master inverter controller sends the carrier synchronization signal, and the master inverter controller determines the reactive current reference value and the active current reference value of the current equalization apparatus. When the output ends of the inverters are inductive, the reactive currents output by the inverters are adjusted by adjusting input voltage amplitudes of the inverters such that the reactive currents output by the inverters are equalized, and the active currents output by the inverters are adjusted by adjusting phase differences between carrier signals generated by the inverters and the carrier synchronization signal such that the active currents output by the inverters are equalized. Therefore, both the reactive currents and the active currents that are output by the inverters are equalized. This can ensure that currents output by the inverters are equalized. In the current equalization apparatus, it is unnecessary to dispose a relatively large quantity of large-sized electronic hardware devices, and current equalization of the currents output by the inverters can be ensured only by adjusting the input voltage amplitudes of the inverters and the phase differences between the carrier signals generated by the inverters and the carrier synchronization signal.

The following describes a current equalization apparatus in the second implementation.

Apparatus Embodiment 3

Figure 10:
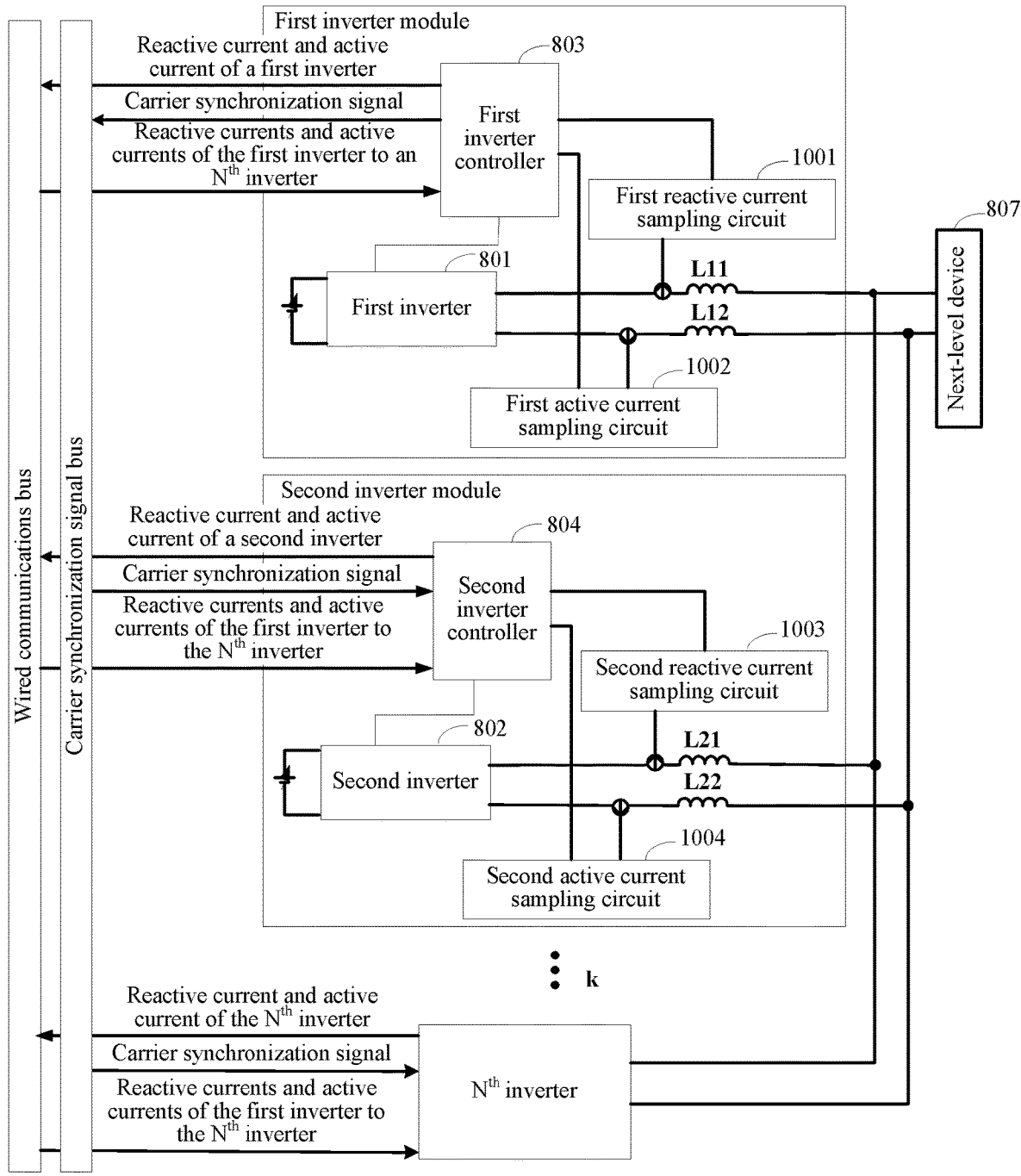
FIG. 10 is a structural diagram of a current equalization apparatus that is applicable when inverters are in high-frequency parallel connection according to apparatus embodiment 3 of this application.

Referring to FIG. 10, FIG. 10 is a structural diagram of still another current equalization apparatus that is applicable when inverters are in high-frequency parallel connection according to this embodiment.

In addition to the components included in apparatus embodiment 1, the current equalization apparatus further includes a first reactive current sampling circuit 1001, a first active current sampling circuit 1002, a second reactive current sampling circuit 1003, and a second active current sampling circuit 1004.

The first reactive current sampling circuit 1001 is configured to obtain a reactive current of a first inverter.

The first active current sampling circuit 1002 is configured to obtain an active current of the first inverter.

The second reactive current sampling circuit 1003 is configured to obtain a reactive current of a second inverter.

The second active current sampling circuit 1004 is configured to obtain an active current of the second inverter.

A first inverter controller 803 is configured to obtain an average reactive current value of the reactive current of the first inverter 801 and the reactive current of the second inverter 802, and use the average reactive current value as a reactive current reference value, and further configured to obtain an average active current value of the active current of the first inverter 801 and the active current of the second inverter 802, and use the average active current value as an active current reference value.

A second inverter controller 804 is configured to obtain the average reactive current value of the reactive current of the first inverter 801 and the reactive current of the second inverter 802, and use the average reactive current value as the reactive current reference value, and further configured to obtain the average active current value of the active current of the first inverter 801 and the active current of the second inverter 802, and use the average active current value as the active current reference value.

As shown in FIG. 10, the first inverter controller 803 is a master inverter controller. The master inverter controller sends a carrier synchronization signal to a carrier synchronization signal bus, and the carrier synchronization signal bus sends the carrier synchronization signal to another slave inverter controller.

As shown in FIG. 10, the first reactive current sampling circuit 1001 collects the reactive current of the first inverter, and sends the collected reactive current of the first inverter to the first inverter controller 803. The first active current sampling circuit 1002 collects the active current of the first inverter, and sends the collected active current of the first inverter to the first inverter controller 803.

The first reactive current sampling circuit 1001 and the first active current sampling circuit 1002 may collect the reactive current and the active current of the first inverter both from a positive output end of the first inverter, or collect the reactive current and the active current of the first inverter both from a negative output end of the first inverter, or collect the reactive current and the active current of the first inverter from the positive output end of the first inverter and the negative output end of the first inverter, respectively. Locations at which the first reactive current sampling circuit and the first active current sampling circuit collect the currents are not limited herein.

The first inverter controller 803 sends the reactive current and the active current of the first inverter to a wired communications bus.

Operating modes of other inverter modules are the same as an operating mode of a first inverter module. A corresponding reactive current sampling circuit collects a reactive current of an inverter, and sends the reactive current to a corresponding inverter controller, and a corresponding active current sampling circuit collects an active current of the inverter, and sends the active current to the corresponding inverter controller. Then, the inverter controllers send the reactive currents and the active currents of the inverters to the wired communications bus.

Each inverter controller collects, on the wired communications bus, the reactive currents sent by the inverter controllers, calculates an average reactive current value based on the reactive currents, and uses the average reactive current value as the reactive current reference value. Further, a reactive current of a corresponding inverter is adjusted based on the reactive current reference value such that a difference between the reactive current of the inverter and the reactive current reference value falls within a preset range.

Each inverter controller collects, on the wired communications bus, the active currents sent by the inverter controllers, calculates an average active current value based on the active currents, and uses the average active current value as the active current reference value. Further, an active current of a corresponding inverter is adjusted based on the active current reference value such that a difference between the active current of the inverter and the active current reference value falls within a preset range.

According to the current equalization apparatus provided in this embodiment, the master inverter controller and the slave inverter controller are determined from the inverter controllers, and the master inverter controller sends the carrier synchronization signal. Both the master inverter controller and the slave inverter controller receive the reactive currents and the active currents of the inverters on the wired communications bus, and both the master inverter controller and the slave inverter controller calculate the reactive current reference value and the active current reference value based on the reactive currents and the active currents of the inverters. When the output ends of the inverters are inductive, the reactive currents output by the inverters are adjusted by adjusting input voltage amplitudes of the inverters such that the reactive currents output by the inverters are equalized, and the active currents output by the inverters are adjusted by adjusting phase differences between carrier signals generated by the inverters and the carrier synchronization signal such that the active currents output by the inverters are equalized. Therefore, both the reactive currents and the active currents that are output by the inverters are equalized. This can ensure that currents output by the inverters are equalized. In the current equalization apparatus, it is unnecessary to dispose a relatively large quantity of large-sized electronic hardware devices, and current equalization of the currents output by the inverters can be ensured only by adjusting the input voltage amplitudes of the inverters and the phase differences between the carrier signals generated by the inverters and the carrier synchronization signal.

Based on the current equalization methods and apparatuses that are provided in the foregoing embodiments and that are applicable when the inverters are in high-frequency parallel connection, an embodiment of this application further provides an inverter system that is applicable when inverters are in high-frequency parallel connection. The following describes in detail an operating principle of the inverter system with reference to the accompanying drawings.

System Embodiment 1

Figure 11:
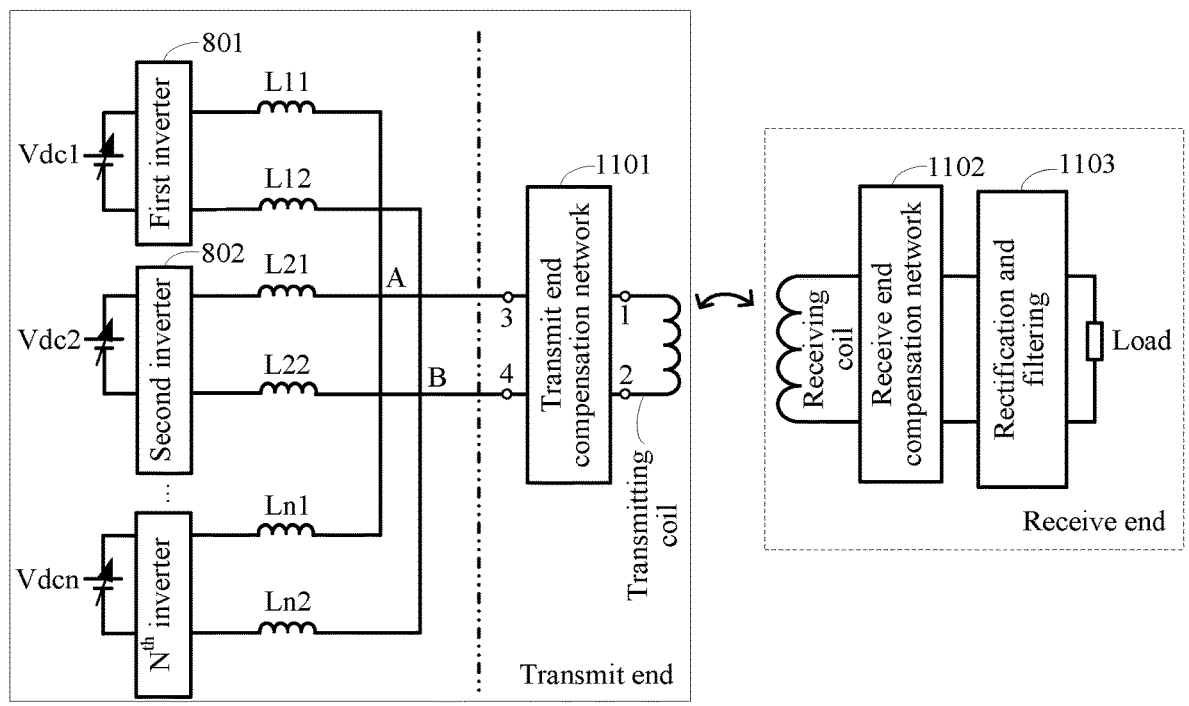
FIG. 11 is a structural diagram of an inverter system that is applicable when inverters are in high-frequency parallel connection according to system embodiment 1 of this application.

Referring to FIG. 11, FIG. 11 is a structural diagram of an inverter system that is applicable when inverters are in high-frequency parallel connection according to this embodiment.

The system includes one or more the current equalization apparatuses in the foregoing apparatus embodiments, and further includes at least the following two inverters whose output ends are in high-frequency parallel connection a first inverter 801 and a second inverter 802.

It should be noted that, to describe other components in the inverter system more clearly, current equalization apparatuses are simplified in the accompany drawings, and the current equalization apparatuses in the apparatus embodiments are indicated merely by inverters.

An input end of the first inverter 801 is connected to a first adjustable power supply Vdc1.

An input end of the second inverter 802 is connected to a second adjustable power supply Vdc2.

Input voltage amplitudes of the inverters are adjusted by adjusting voltage amplitudes of adjustable power supplies connected to input ends of the inverters, and further reactive currents of the inverters are adjusted such that the reactive currents output by the inverters are equalized.

As shown in FIG. 11, FIG. 11 is a structural diagram of the inverter system that is provided in this embodiment and that is applied to the wireless charging field. The inverters are connected in parallel to a positive common parallel-connection point A and a negative common parallel-connection point B. The inverters each invert a direct-current voltage input by an adjustable power supply to a high-frequency alternating-current voltage. An alternating current is generated from the high-frequency alternating-current voltage on a transmitting coil using a transmit end compensation network 1101. The alternating current generates an alternating magnetic field.

An alternating-current voltage is obtained through electromagnetic induction by a receiving coil at two ends of the receiving coil, and the induced alternating-current voltage is converted by a receive end compensation network 1102 and a rectification and filter circuit 1103 into a direct-current voltage required by a load.

According to the inverter system provided in this embodiment, when output ends of the inverters are inductive, the reactive currents output by the inverters are adjusted by adjusting the input voltage amplitudes of the inverters such that the reactive currents output by the inverters are equalized, and active currents output by the inverters are adjusted by adjusting phase differences between carrier signals generated by the inverters and a carrier synchronization signal such that the active currents output by the inverters are equalized. Therefore, both the reactive currents and the active currents that are output by the inverters are equalized. This can ensure that currents output by the inverters are equalized. In the inverter system, it is unnecessary to dispose a relatively large quantity of large-sized electronic hardware devices, and current equalization of the currents output by the inverters can be ensured only by adjusting the input voltage amplitudes of the inverters and the phase differences between the carrier signals generated by the inverters and the carrier synchronization signal.

The adjustable power supply in the inverter system provided in system embodiment 1 may be an adjustable direct-current power supply, or may be an adjustable alternating-current power supply. When the adjustable power supply is the adjustable alternating-current power supply, a rectifier is needed to rectify an alternating current to a direct current and then supply the direct current to an input end of an inverter.

The following describes an embodiment in which an adjustable power supply is an adjustable direct-current power supply.

System Embodiment 2

Figure 12A:
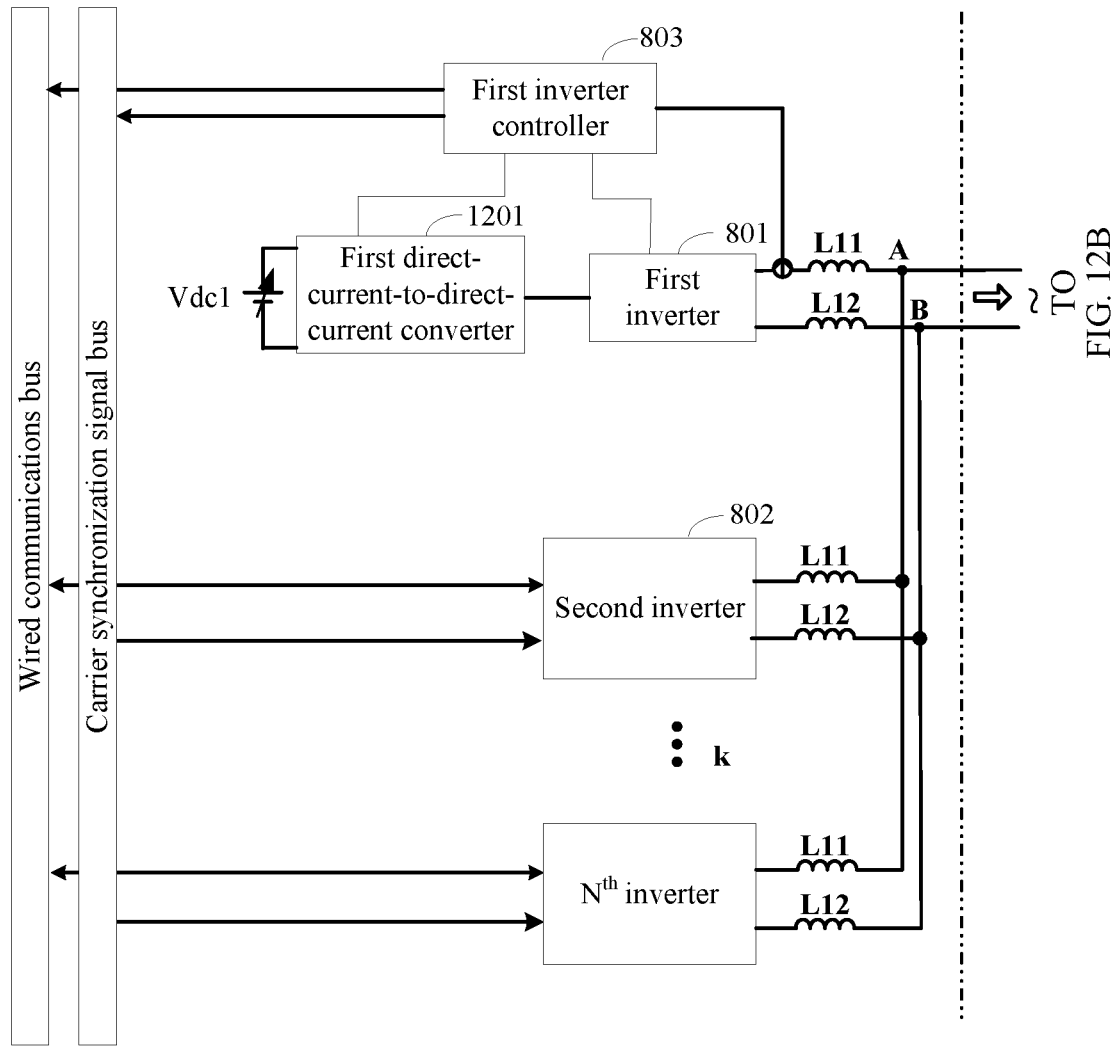
FIG. 12A is a structural diagram of an inverter system that is applicable when inverters are in high-frequency parallel connection according to system embodiment 2 of this application.
Figure 12B:
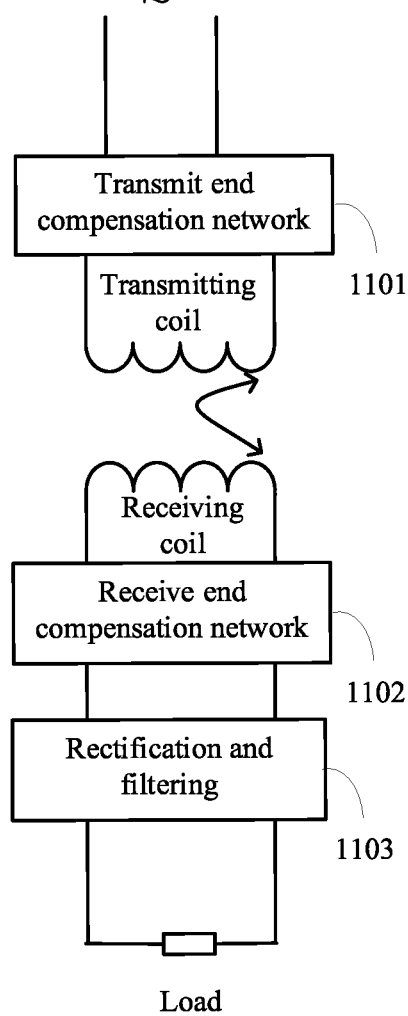
FIG. 12B is another structural diagram of an inverter system that is applicable when inverters are in high-frequency parallel connection according to system embodiment 2 of this application.

Referring to FIG. 12A and FIG. 12B, FIG. 12A and FIG. 12B are a structural diagram of another inverter system according to this embodiment.

In the system, adjustable power supplies are adjustable direct-current power supplies. To indicate the accompany drawings more clearly, FIG. 12A and FIG. 12B show only a first direct-current-to-direct-current converter 1201 connected to a first inverter 801, and a first adjustable direct-current power supply Vdc1. Direct-current-to-direct-current converters connected to other inverters may all be the same as the first direct-current-to-direct-current converter, and other adjustable direct-current power supplies may all be the same as the first adjustable direct-current power supply.

The first direct-current-to-direct-current converter 1201 is configured to convert a voltage output by the first adjustable direct-current power supply Vdc1, and supply a voltage obtained through conversion to an input end of the first inverter.

Correspondingly, voltages output by the other adjustable direct-current power supplies are converted by corresponding direct-current-to-direct-current converters, and a voltage output by the adjustable direct-current power supply is converted.

It should be noted that the direct-current-to-direct-current converter may be a Boost-buck circuit, a Buck buck circuit, or a Boost-Buck boost-buck circuit, and a type of the direct-current-to-direct-current converter is not limited herein.

Figure 13A:
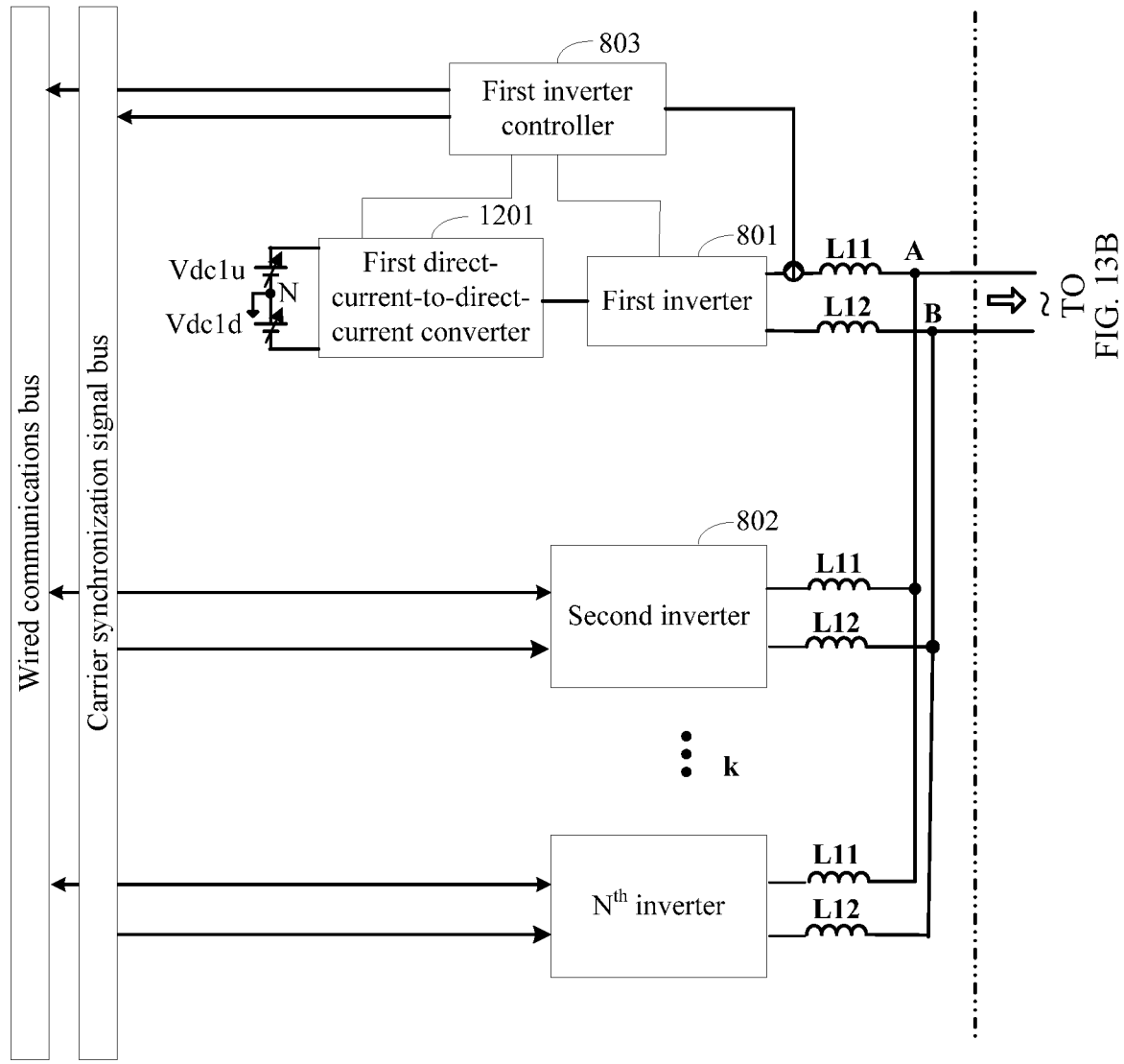
FIG. 13A is a structural diagram of another inverter system that is applicable when inverters are in high-frequency parallel connection according to system embodiment 2 of this application.
Figure 13B:
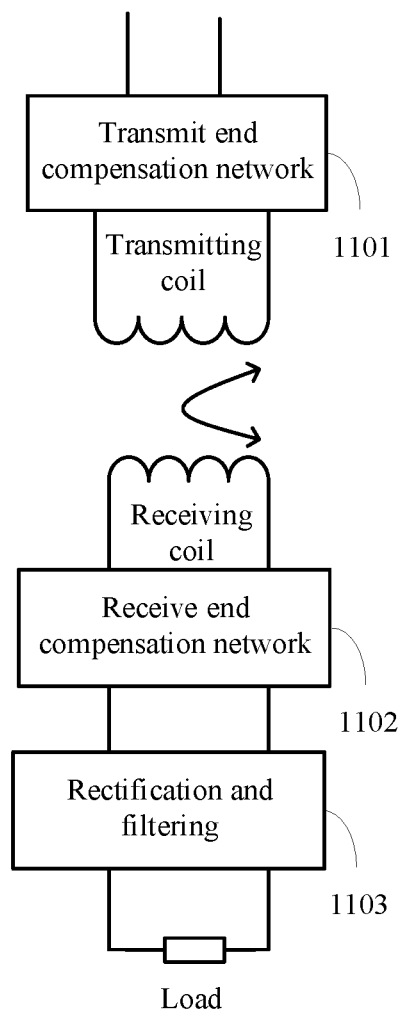
FIG. 13B is another structural diagram of another inverter system that is applicable when inverters are in high-frequency parallel connection according to system embodiment 2 of this application.

In addition, the adjustable direct-current power supply may include two adjustable direct-current power supplies that are serially connected. As shown in FIG. 13A and FIG. 13B, the first adjustable direct-current power supply includes an adjustable direct-current power supply Vdc1$u$ and an adjustable direct-current power supply Vdc1$d$ that are serially connected.

According to the inverter system provided in this embodiment, when output ends of the inverters are inductive, input voltage amplitudes of the inverters may be adjusted by adjusting adjustable direct-current power supplies and direct-current-to-direct-current converters, and further reactive currents output by the inverters are adjusted, to implement current equalization. Then, phase differences between carrier signals generated by the inverters and a carrier synchronization signal are adjusted, to adjust active currents output by the inverters such that the active currents output by the inverters are equalized. Therefore, both the reactive currents and the active currents that are output by the inverters are equalized. This can ensure that currents output by the inverters are equalized.

The following describes an embodiment in which an adjustable power supply is an adjustable alternating-current power supply.

System Embodiment 3

Figure 14A:
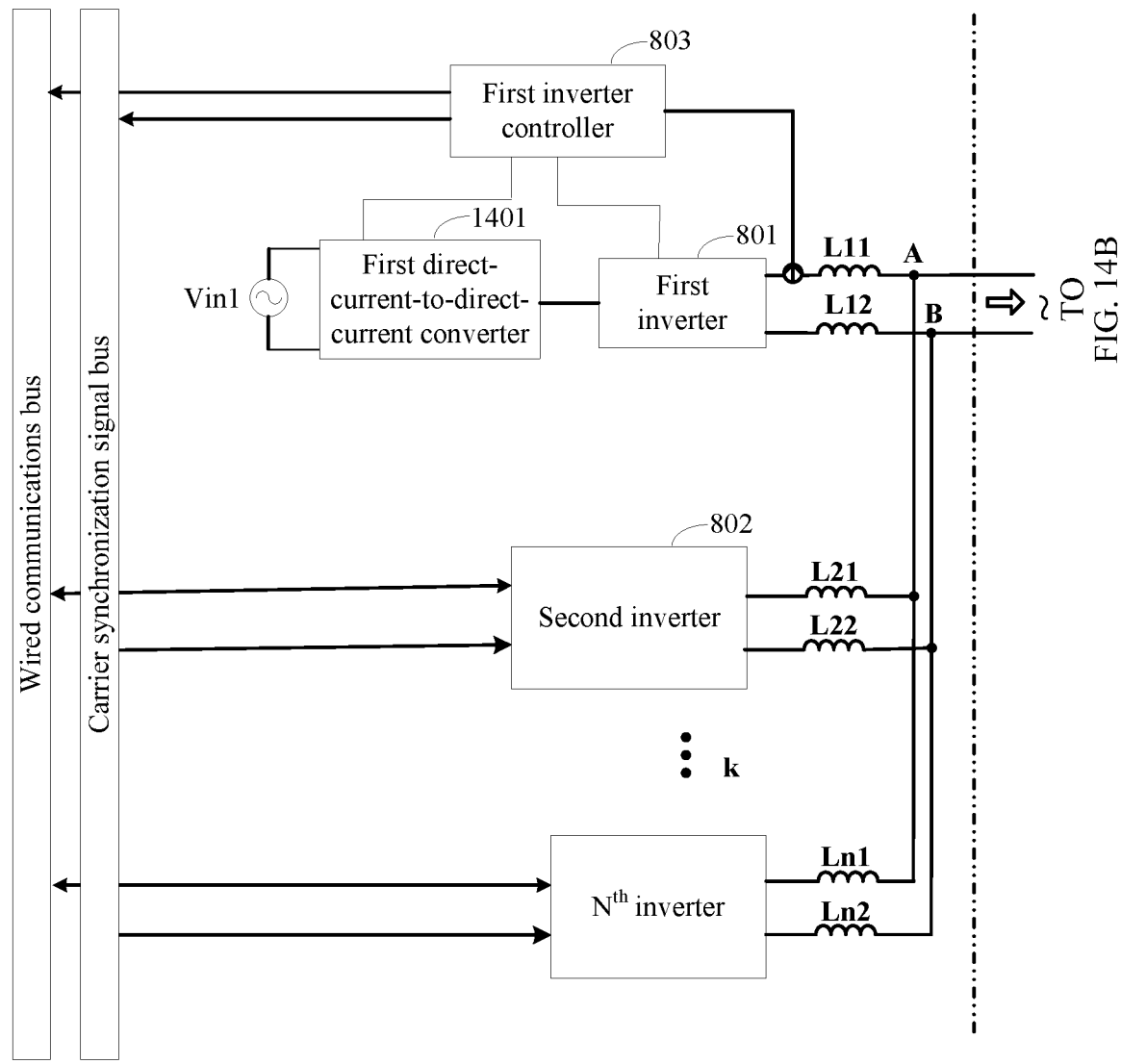
FIG. 14A is a structural diagram of an inverter system that is applicable when inverters are in high-frequency parallel connection according to system embodiment 3 of this application.
Figure 14B:
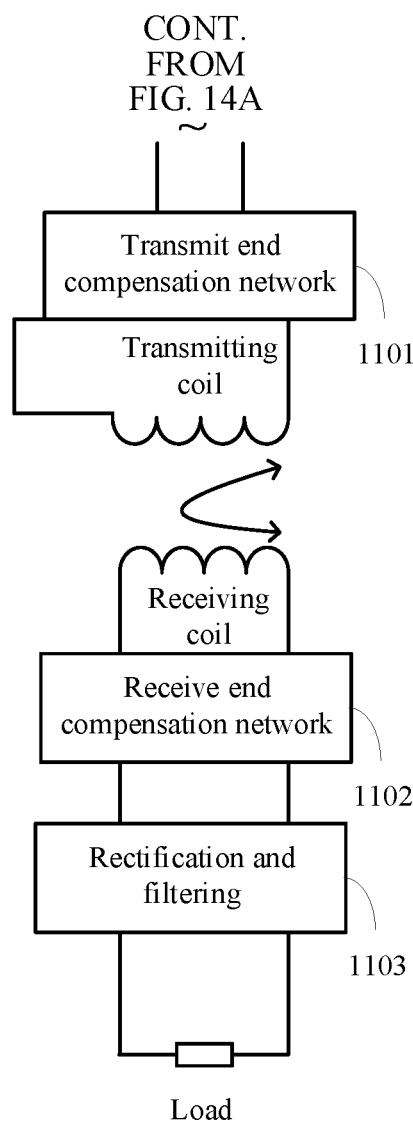
FIG. 14B is another structural diagram of an inverter system that is applicable when inverters are in high-frequency parallel connection according to system embodiment 3 of this application.

Referring to FIG. 14A and FIG. 14B, FIG. 14A and FIG. 14B are a structural diagram of still another inverter system according to this embodiment.

In the system, adjustable power supplies are adjustable alternating-current power supplies. To indicate the accompany drawings more clearly, FIG. 14A and FIG. 14B show only a first alternating-current-to-direct-current converter 1401 connected to a first inverter 801, and a first adjustable alternating-current power supply Vin1. Alternating-current-to-direct-current converters connected to other inverters may all be the same as the first alternating-current-to-direct-current converter, and other adjustable alternating-current power supplies may all be the same as the first adjustable alternating-current power supply.

The first alternating-current-to-direct-current converter 1401 is configured to rectify the first adjustable alternating-current power supply Vin1 to obtain a direct current, and supply the direct current to an input end of the first inverter.

Correspondingly, voltages output by the other adjustable alternating-current power supplies are processed by corresponding alternating-current-to-direct-current converters, and a voltage output by the adjustable alternating-current power supply is converted.

Figure 15A:
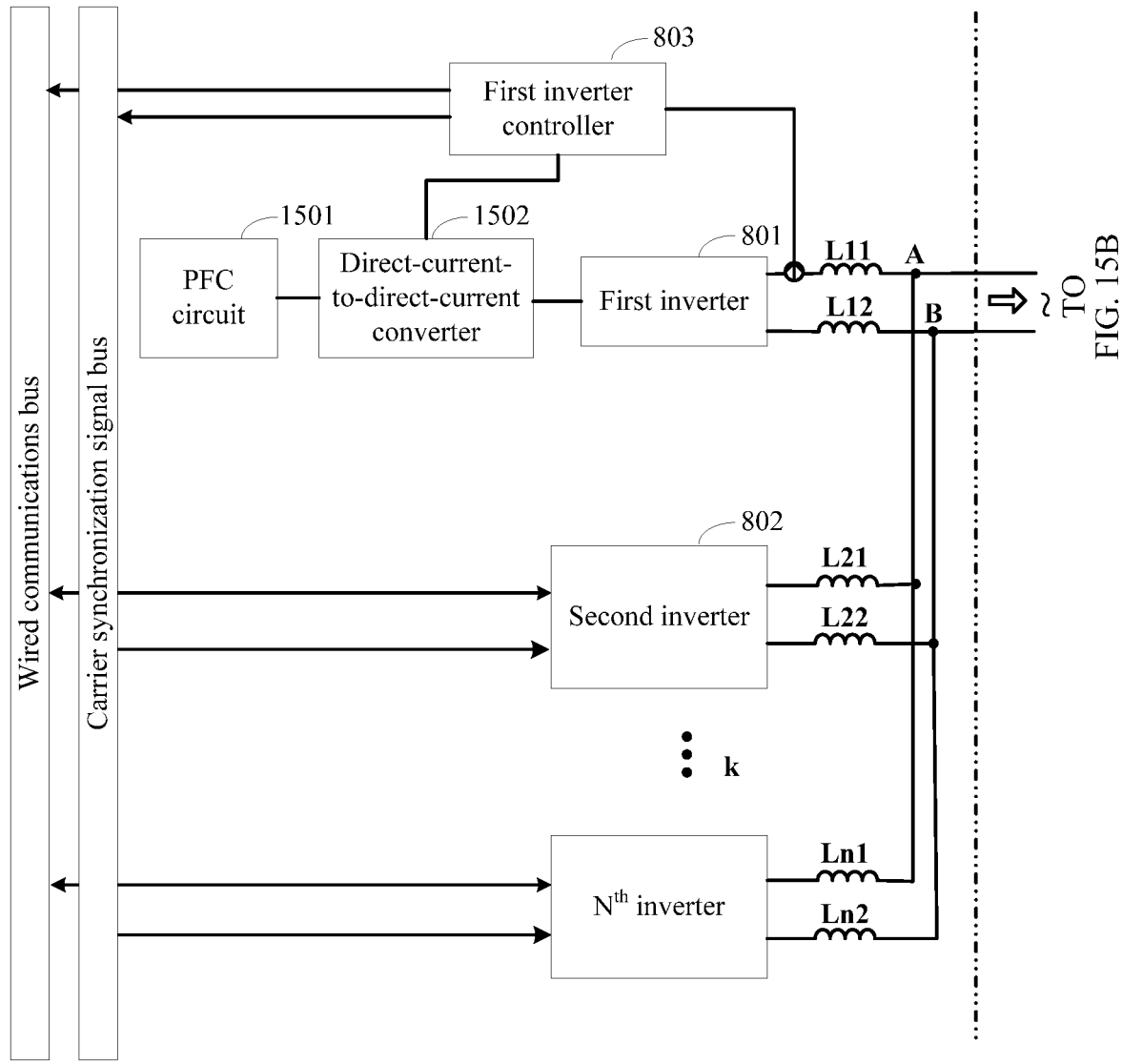
FIG. 15A is a structural diagram of another inverter system that is applicable when inverters are in high-frequency parallel connection according to system embodiment 3 of this application.
Figure 15B:
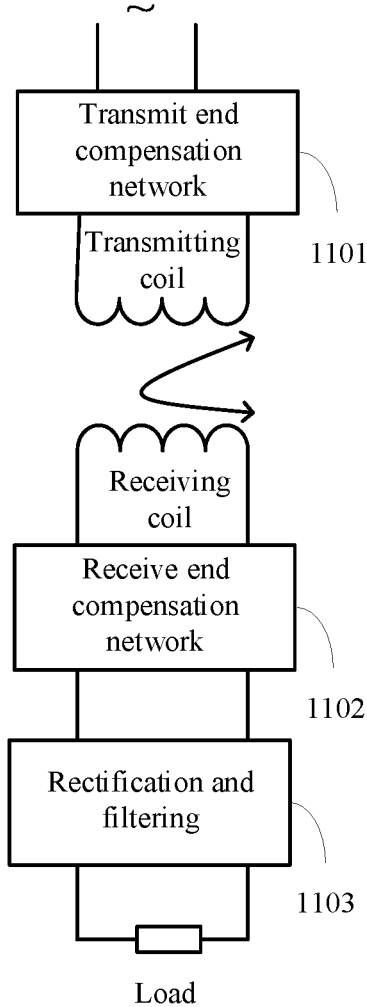
FIG. 15B is another structural diagram of another inverter system that is applicable when inverters are in high-frequency parallel connection according to system embodiment 3 of this application.

In addition, as shown in FIG. 15A and FIG. 15B, a power factor correction (PFC) circuit 1501 may be further used, to convert an alternating-current voltage in a power grid into a direct-current voltage. Specifically, because the PFC circuit includes a rectifier circuit, the alternating-current voltage in the power grid can be rectified to the direct-current voltage. Then, the direct-current voltage may be adjusted to an input voltage of an inverter based on an instruction sent by an inverter controller and using a direct-current-to-direct-current converter 1502, and further a reactive current output by the inverter is adjusted.

Figure 16A:
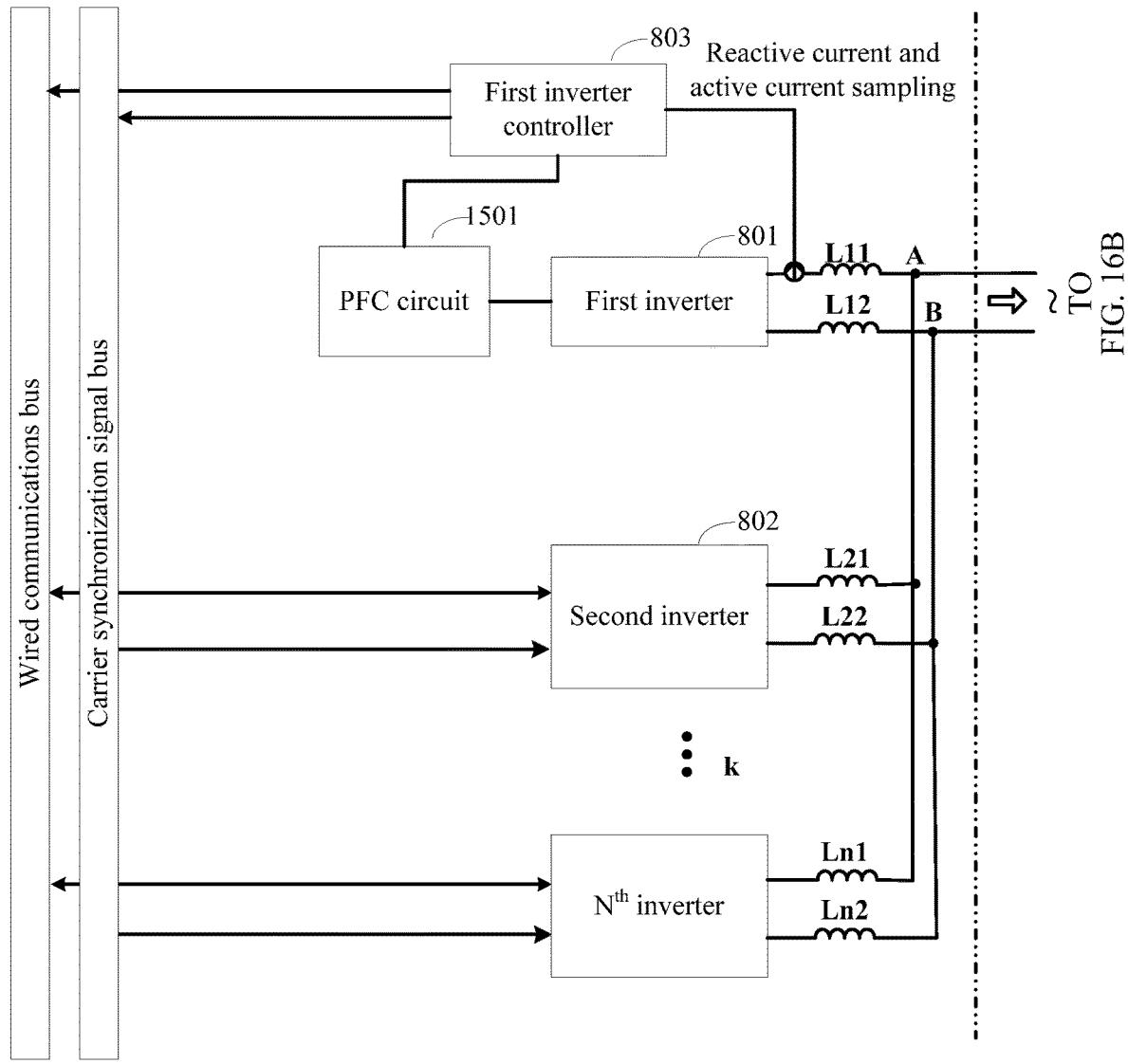
FIG. 16A is a structural diagram of still another inverter system that is applicable when inverters are in high-frequency parallel connection according to system embodiment 3 of this application.
Figure 16B:
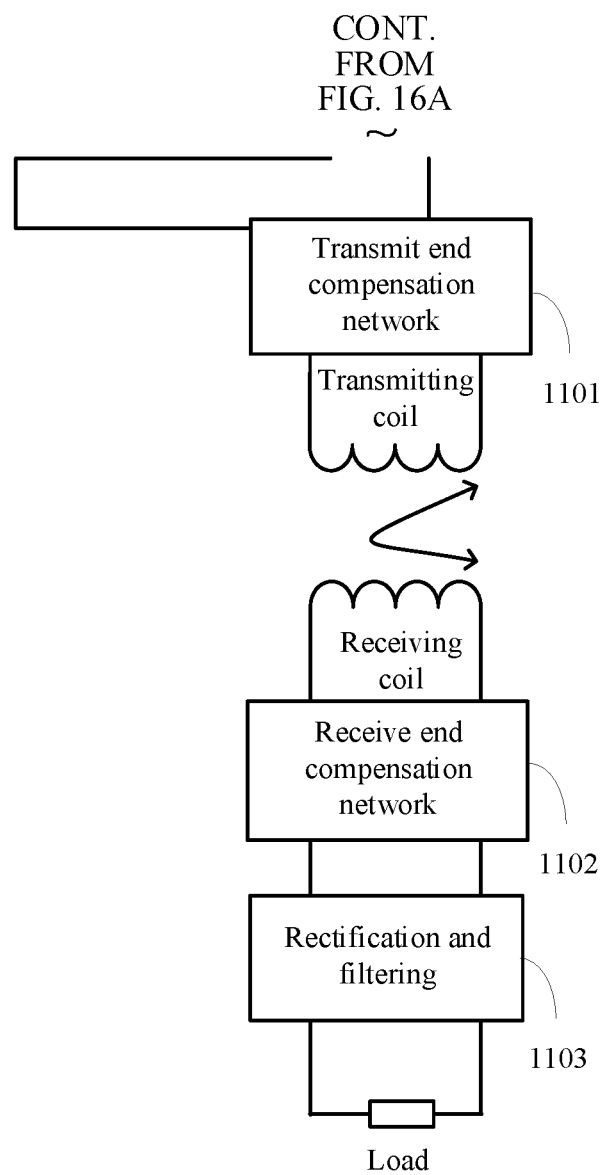
FIG. 16B is another structural diagram of still another inverter system that is applicable when inverters are in high-frequency parallel connection according to system embodiment 3 of this application.

Because an alternating-current-to-direct-current converter in the PFC circuit may also be controlled by the inverter controller, a function of adjusting the input voltage of the inverter can also be implemented only by disposing the PFC circuit in the system. As shown in FIG. 16A and FIG. 16B, an instruction sent by an inverter controller is sent to a PFC circuit 1501. The PFC circuit 1501 converts an alternating-current voltage in a power grid into a required direct-current voltage based on the instruction, and uses the direct-current voltage as an input voltage of an inverter, to achieve an objective of adjusting a reactive current.

According to the inverter system provided in this embodiment, when output ends of the inverters are inductive, input voltage amplitudes of the inverters may be adjusted by adjusting adjustable alternating-current power supplies and alternating-current-to-direct-current converters, and further reactive currents output by the inverters are adjusted, to implement current equalization. Then, phase differences between carrier signals generated by the inverters and a carrier synchronization signal are adjusted, to adjust active currents output by the inverters such that the active currents output by the inverters are equalized. Therefore, both the reactive currents and the active currents that are output by the inverters are equalized. This can ensure that currents output by the inverters are equalized.

An embodiment of this application further provides a wireless charging system. For example, when the wireless charging system is used for charging an electric vehicle, a load may be a storage battery of the electric vehicle. For details, refer to schematic diagrams of the systems shown in FIG. 11 to FIG. 16A and FIG. 16B.

The wireless charging system provided in this embodiment includes the current equalization apparatuses in the foregoing embodiments, and further includes at least the following two inverters whose output ends are in high-frequency parallel connection a first inverter and a second inverter. The wireless charging system further includes a first adjustable power supply, a second adjustable power supply, a radio transmitter circuit, and a radio receiver circuit.

An input end of the first inverter is connected to the first adjustable power supply.

An input end of the second inverter is connected to the second adjustable power supply.

An output end of the first inverter is connected to an input end of the radio transmitter circuit.

An output end of the second inverter is connected to the input end of the radio transmitter circuit.

The radio transmitter circuit transmits electric energy in a wireless manner, and the radio receiver circuit receives, in a wireless manner, the electric energy transmitted by the radio transmitter circuit, to supply power to the load.

The radio transmitter circuit includes a transmit end compensation network and a transmitting coil, and the radio receiver circuit includes a receive compensation network and a receiving coil.

An input end of the transmit end compensation network is used as the input end of the radio transmitter circuit, and an output end of the transmit end compensation network is connected to the transmitting coil.

The receiving coil is connected to an input end of the receive compensation network, and an output end of the receive compensation network is connected to the load.

In addition, the inverter systems provided in the foregoing embodiments may be further applied to the induction heating field. In this case, the load may be a device that needs to be heated. For example, various bar sections need to be heated for melting or deformation. Specifically, an aluminum device may be cast, and so on.

The foregoing embodiments are merely intended for describing the technical solutions in this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An inverter current equalization method, comprising:
   implementing current equalization when a first output end of a first inverter of at least two inverters and a second output end of a second inverter of the at least two inverters are in high-frequency parallel connection, wherein the first output end and the second output end are inductive;
   comparing a first reactive current of the first inverter with a reactive current reference value to obtain a first reactive current difference of the first inverter;
   comparing a second reactive current of the second inverter with the reactive current reference value to obtain a second reactive current difference of the second inverter;
   comparing a first active current of the first inverter with an active current reference value to obtain a first active current difference of the first inverter;
   comparing a second active current of the second inverter with the active current reference value to obtain a second active current difference of the second inverter;
   adjusting a first input voltage amplitude of the first inverter based on the first reactive current difference;
   adjusting a second input voltage amplitude of the second inverter based on the second reactive current difference;
   adjusting, based on the first active current difference and the second active current difference, a first phase difference between a first carrier signal from the first inverter and a carrier synchronization signal and a second phase difference between a second carrier signal from the second inverter and the carrier synchronization signal; and
   equalizing a first output current of the first inverter and a second output current of the second inverter,
   wherein the carrier synchronization signal is a pulse signal simultaneously input to the at least two inverters.

2. The inverter current equalization method of claim 1, further comprising:
   obtaining a first voltage fine-tuning amount based on the first reactive current difference;
   adding the first voltage fine-tuning amount and a first voltage adjustment setting value to obtain a first given input voltage value of the first inverter;
   adjusting the first input voltage amplitude based on the first given input voltage value;
   obtaining a second voltage fine-tuning amount based on the second reactive current difference;
   adding the second voltage fine-tuning amount and a second voltage adjustment setting value to obtain a second given input voltage value of the second inverter; and
   adjusting the second input voltage amplitude based on the second given input voltage value.

3. The inverter current equalization method of claim 1, further comprising:
   obtaining a first angle fine-tuning amount based on the first active current difference;
   adding the first angle fine-tuning amount and a first angle adjustment setting value to obtain a first given phase value of the first carrier signal;
   adjusting the first phase difference based on the first given phase value;
   obtaining a second angle fine-tuning amount based on the second active current difference;

adding the second angle fine-tuning amount and a second angle adjustment setting value to obtain a second given phase value of the second carrier signal; and adjusting the second phase difference based on the second given phase value.

4. The inverter current equalization method of claim 1, further comprising:

collecting the first output current as the first active current at a first midpoint moment of a positive half cycle of a first output voltage of the first inverter;

collecting the second output current as the second active current at a second midpoint moment of a positive half cycle of a second output voltage of the second inverter;

collecting the first output current as the first reactive current at a first positive-negative transition moment of the first output voltage; and collecting the second output current as the second reactive current at a second positive-negative transition moment of the second output voltage.

5. The inverter current equalization method of claim 1, wherein the output end of the first inverter and the output end of the second inverter are connected in parallel, wherein a first frequency of a first output voltage of the first inverter is the same as a first switching frequency of the first inverter, and wherein a second frequency of a second output voltage of the second inverter is the same as a second switching frequency of the second inverter.

6. The inverter current equalization method of claim 1, wherein the reactive current reference value is a first average value of the first reactive current and the second reactive current, and wherein the active current reference value is a second average value of the first active current and the second active current.

7. The inverter current equalization method of claim 1, further comprising:

collecting the first output current as the first active current at a first midpoint moment of a negative half cycle of a first output voltage of the first inverter;

collecting the second output current as the second active current at a second midpoint moment of a positive half cycle of a second output voltage of the second inverter;

collecting the first output current as the first reactive current at a first positive-negative transition moment of the first output voltage; and collecting the second output current as the second reactive current at a second positive-negative transition moment of the second output voltage.

8. The inverter current equalization method of claim 1, further comprising:

collecting the first output current as the first active current at a first midpoint moment of a positive half cycle of a first output voltage of the first inverter;

collecting the second output current as the second active current at a second midpoint moment of a negative half cycle of a second output voltage of the second inverter;

collecting the first output current as the first reactive current at a first positive-negative transition moment of the first output voltage; and collecting the second output current as the second reactive current at a second positive-negative transition moment of the second output voltage.

9. The inverter current equalization method of claim 1, further comprising:

collecting the first output current as the first active current at a first midpoint moment of a negative half cycle of a first output voltage of the first inverter;

collecting the second output current as the second active current at a second midpoint moment of a negative half cycle of a second output voltage of the second inverter;

collecting the first output current as the first reactive current at a first positive-negative transition moment of the first output voltage; and collecting the second output current as the second reactive current at a second positive-negative transition moment of the second output voltage.

10. An inverter current equalization apparatus, comprising:

at least two inverters, wherein a first inverter of the at least two inverters comprises a first output end, wherein a second inverter of the at least two inverters comprises a second output end, wherein the first inverter and the second inverter are connected in parallel and are inductive, and wherein the inverter current equalization apparatus is configured to implement current equalization when the first output end and the second output end are in high-frequency parallel connection;

a first inverter controller coupled to the first inverter and configured to:

compare a first reactive current of the first inverter with a reactive current reference value to obtain a first reactive current difference of the first inverter;

adjust a first input voltage amplitude of the first inverter based on the first reactive current difference;

compare a first active current of the first inverter with an active current reference value to obtain a first active current difference of the first inverter; and adjust a first phase difference between a first carrier signal from the first inverter and a carrier synchronization signal based on the first active current difference, wherein the carrier synchronization signal is a pulse signal simultaneously input to the at least two inverters;

a second inverter controller coupled to the second inverter and configured to:

compare a second reactive current of the second inverter with the reactive current reference value to obtain a second reactive current difference of the second inverter;

adjust a second input voltage amplitude of the second inverter based on the second reactive current difference;

compare a second active current of the second inverter with the active current reference value to obtain a second active current difference of the second inverter; and adjust a second phase difference between a second carrier signal from the second inverter and the carrier synchronization signal based on the second active current difference;

a first inductive component configured to enable the first output end to be inductive; and a second inductive component configured to enable the second output end to be inductive, wherein the first output end is connected to a common parallel-connection point using the first inductive component, and wherein the second output end is connected to the common parallel-connection point using the second inductive component.

11. The inverter current equalization apparatus of claim 10, further configured to:
- select a master inverter controller and a slave inverter controller from the first inverter controller and the second inverter controller using a predetermined mechanism;
- generate the carrier synchronization signal from the master inverter controller; and
- send the carrier synchronization signal to the slave inverter controller.

12. The inverter current equalization apparatus of claim 11, further comprising:
- a first reactive current sampling circuit configured to obtain the first reactive current;
- a first active current sampling circuit configured to obtain the first active current;
- a second reactive current sampling circuit configured to obtain the second reactive current;
- a second active current sampling circuit configured to obtain the second active current,
- wherein the master inverter controller is configured to:
  - obtain an average reactive current value of the first reactive current and the second reactive current,
  - use the average reactive current value as the reactive current reference value;
  - send the reactive current reference value to the slave inverter controller;
  - obtain an average active current value of the first active current and the second active current;
  - use the average active current value as the active current reference value; and
  - send the active current reference value to the slave inverter controller.

13. The inverter current equalization apparatus of claim 10, further comprising:
- a first reactive current sampling circuit configured to obtain the first reactive current;
- a first active current sampling circuit configured to obtain the first active current;
- a second reactive current sampling circuit configured to obtain the second reactive current;
- a second active current sampling circuit configured to obtain the second active current,
- wherein the first inverter controller is configured to:
  - obtain an average reactive current value of the first reactive current and the second reactive current;
  - use the average reactive current value as the reactive current reference value;
  - obtain an average active current value of the first active current and the second active current; and
  - use the average active current value as the active current reference value, and wherein the second inverter controller is configured to:
  - obtain the average reactive current value of the first reactive current and the second reactive current;
  - use the average reactive current value as the reactive current reference value;
  - obtain the average active current value of the first active current and the second active current; and
  - use the average active current value as the active current reference value.

14. An inverter system, comprising:
an inverter current equalization apparatus, comprising:
  at least two inverters, wherein a first inverter of the at least two inverters comprises a first output end, wherein a second inverter of the at least two inverters comprises a second output end, wherein the first inverter and the second inverter are connected in parallel and are inductive, and wherein the inverter current equalization apparatus is configured to implement current equalization when the first output end and the second output end are in high-frequency parallel connection;
  a first inverter controller coupled to the first inverter and configured to:
    compare a first reactive current of the first inverter with a reactive current reference value to obtain a first reactive current difference of the first inverter;
    adjust a first input voltage amplitude of the first inverter based on the first reactive current difference;
    compare a first active current of the first inverter with an active current reference value to obtain a first active current difference of the first inverter; and
    adjust a first phase difference between a first carrier signal from the first inverter and a carrier synchronization signal based on the first active current difference, wherein the carrier synchronization signal is a pulse signal simultaneously input to the two inverters;
  a second inverter controller coupled to the second inverter and configured to:
    compare a second reactive current of the second inverter with the reactive current reference value to obtain a second reactive current difference of the second inverter;
    adjust a second input voltage amplitude of the second inverter based on the second reactive current difference;
    compare a second active current of the second inverter with the active current reference value to obtain a second active current difference of the second inverter; and
    adjust a second phase difference between a second carrier signal from the second inverter and the carrier synchronization signal based on the second active current difference;
  a first inductive component configured to enable the first output end to be inductive; and
  a second inductive component configured to enable the second output end to be inductive, wherein the first output end is connected to a common parallel-connection point using the first inductive component, and wherein the second output end is connected to the common parallel-connection point using the second inductive component;
a third inverter comprising a first input end connected to a first adjustable power supply; and
a fourth inverter comprising a second input end connected to a second adjustable power supply.

15. The inverter system of claim 14, further comprising:
a first direct-current-to-direct-current converter coupled to the third inverter and configured to:
  convert a voltage output by the first adjustable power supply; and
  supply a voltage obtained through conversion to the first input end; and
a second direct-current-to-direct-current converter coupled to the fourth inverter configured to:
  convert a voltage output by the second adjustable power supply; and
  supply the voltage obtained through conversion to the second input end, wherein the first adjustable power supply is a first adjustable direct-current power supply, wherein the second adjustable power supply is a second adjustable direct-current power supply.

16. The inverter system of claim 14, further comprising:
a first alternating-current-to-direct-current converter coupled to the third inverter configured to:
rectify the first adjustable power supply to obtain a direct current; and
supply the direct current to the input end of the first inverter; and
a second alternating-current-to-direct-current converter coupled to the fourth inverter and configured to:
rectify the second adjustable power supply to obtain the direct current; and
supply the direct current to the input end of the fourth inverter,
wherein the first adjustable power supply is a first adjustable alternating-current power supply, and
wherein the second adjustable power supply is a second adjustable alternating-current power supply.

17. A wireless charging system, comprising:
an inverter current equalization apparatus, comprising:
at least two inverters, wherein a first inverter of the at least two inverters comprises a first output end, wherein a second inverter of the at least two inverters comprises a second output end, wherein the first inverter and the second inverter are connected in parallel and are inductive, and wherein the inverter current equalization apparatus is configured to implement current equalization when the first output end and the second output end are in high-frequency parallel connection;
a first inverter controller coupled to the first inverter and configured to:
compare a first reactive current of the first inverter with a reactive current reference value to obtain a first reactive current difference of the first inverter;
adjust a first input voltage amplitude of the first inverter based on the first reactive current difference;
compare a first active current of the first inverter with an active current reference value to obtain a first active current difference of the first inverter; and
adjust a first phase difference between a first carrier signal from the first inverter and a carrier synchronization signal based on the first active current difference, wherein the carrier synchronization signal is a pulse signal simultaneously input to the at least two inverters;
a second inverter controller coupled to the second inverter and configured to:
compare a second reactive current of the second inverter with the reactive current reference value to obtain a second reactive current difference of the second inverter;
adjust a second input voltage amplitude of the second inverter based on the second reactive current difference;
compare a second active current of the second inverter with the active current reference value to obtain a second active current difference of the second inverter; and
adjust a second phase difference between a second carrier signal from the second inverter and the carrier synchronization signal based on the second active current difference;
a first inductive component configured to enable the first output end to be inductive; and
a second inductive component configured to enable the second output end to be inductive, wherein the first output end is connected to a common parallel-connection point using the first inductive component, and wherein the second output end is connected to the common parallel-connection point using the second inductive component;
a first adjustable power supply;
a second adjustable power supply;
a radio transmitter circuit comprising an input end and configured to transmit electric energy in a wireless manner;
a radio receiver circuit wirelessly communicatively coupled to the radio transmitter circuit and configured to receive the electric energy in the wireless manner to supply power to a load;
a third inverter comprising:
an input end coupled to the first adjustable power supply; and
an output end coupled to the input end of the radio transmitter circuit;
a fourth inverter comprising:
an input end coupled to the second adjustable power supply; and
an output end coupled to the input end of the radio transmitter circuit.

18. The wireless charging system of claim 17, wherein the radio transmitter circuit comprises:
a transmitting coil; and
a transmit compensation network comprising:
an input end used as the input end of the radio transmitter circuit; and
an output end coupled to the transmitting coil,
wherein the radio receiver circuit comprises:
a receive compensation network comprising:
an input end; and
an output end coupled to the load; and
a receiving coil coupled to the input end of the receive compensation network.

19. The wireless charging system of claim 17, further comprising a power factor correction (PFC) circuit coupled to the third inverter and comprising a rectifier circuit, wherein the PFC circuit is configured to:
convert an alternating-current voltage in a power grid into a direct-current voltage,
rectify the alternating-current voltage in the power grid to the direct-current voltage.

20. The wireless charging system of claim 19, wherein the PFC circuit is further configured to:
adjust the direct-current voltage to an input voltage to the third inverter based on an instruction from an inverter controller; and
adjust a reactive current output from the third inverter.

* * * * *